United States Patent
Peng et al.

(10) Patent No.: US 11,741,288 B2
(45) Date of Patent: Aug. 29, 2023

(54) ROUTING-RESOURCE-IMPROVING METHOD OF GENERATING LAYOUT DIAGRAM, SYSTEM FOR SAME AND SEMICONDUCTOR DEVICE

(71) Applicant: TAIWAN SEMICONDUCTOR MANUFACTURING COMPANY, LTD., Hsinchu (TW)

(72) Inventors: Shih-Wei Peng, Hsinchu (TW); Jiann-Tyng Tzeng, Hsinchu (TW); Wei-Cheng Lin, Hsinchu (TW); Jay Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/581,848

(22) Filed: Jan. 21, 2022

(65) Prior Publication Data
US 2022/0147688 A1     May 12, 2022

Related U.S. Application Data

(62) Division of application No. 16/558,214, filed on Sep. 2, 2019, now Pat. No. 11,232,248.
(Continued)

(51) Int. Cl.
*G06F 7/00* (2006.01)
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
USPC ................. 716/52, 54, 53, 119, 121, 122
See application file for complete search history.

(56) References Cited

U.S. PATENT DOCUMENTS

| 5,946,476 A | * | 8/1999 | Tomoda | ............... G06F 30/398 |
| | | | | 716/52 |
| 6,691,297 B1 | * | 2/2004 | Misaka | .................... G03F 1/68 |
| | | | | 430/30 |

(Continued)

FOREIGN PATENT DOCUMENTS

| KR | 20180028044 | 3/2018 |
| KR | 2018010937 | 10/2018 |

(Continued)

OTHER PUBLICATIONS

Office Action dated Feb. 15, 2021 for corresponding case No. 10-2019123621.5 (pp. 1-16).

(Continued)

*Primary Examiner* — Brian Ngo
(74) *Attorney, Agent, or Firm* — Hauptman Ham, LLP

(57) ABSTRACT

A method (of manufacturing a semiconductor device) includes, for a layout diagram stored on a non-transitory computer-readable medium, the semiconductor device being based on the layout diagram, the layout diagram including a first level of metallization (M_1st level) and a first level of interconnection (VIA_1st level) thereover corresponding to a first layer of metallization and a first layer of interconnection thereover in the semiconductor device, generating the layout diagram including: selecting a candidate pattern in the layout diagram, the candidate pattern being a first conductive pattern in the M_1st level (first M_1st pattern); determining that the candidate pattern satisfies one or more criteria; and increasing a size of the candidate pattern thereby revising the layout diagram.

20 Claims, 16 Drawing Sheets

Related U.S. Application Data

(60) Provisional application No. 62/739,053, filed on Sep. 28, 2018.

(56) References Cited

U.S. PATENT DOCUMENTS

| | | | |
|---|---|---|---|
| 7,260,442 | B2 | 8/2007 | Hwang et al. |
| 9,256,709 | B2 | 2/2016 | Yu et al. |
| 10,366,200 | B2 | 7/2019 | Lin et al. |
| 2003/0005399 | A1* | 1/2003 | Igarashi ............... G06F 30/39 716/119 |
| 2004/0010388 | A1* | 1/2004 | Ahrikencheikh .... H05K 1/0265 702/121 |
| 2008/0003510 | A1* | 1/2008 | Harazaki ................ G03F 1/36 430/5 |
| 2014/0040838 | A1 | 2/2014 | Liu et al. |
| 2015/0278429 | A1 | 10/2015 | Chang |
| 2016/0125117 | A1* | 5/2016 | Kim ..................... G06F 30/398 716/52 |
| 2016/0314234 | A1 | 10/2016 | Hamouda |
| 2019/0067097 | A1* | 2/2019 | Wang .................... H01L 23/50 |
| 2020/0004919 | A1* | 1/2020 | Ou ........................ G06F 30/30 |

FOREIGN PATENT DOCUMENTS

| | | |
|---|---|---|
| TW | 201814393 | 4/2018 |
| WO | 2019098517 | 5/2019 |

OTHER PUBLICATIONS

Office Action dated Nov. 25, 2021 for corresponding case No. KR 10-2019-0120168. English abstract attached on p. 1. (pp. 1-6).

* cited by examiner

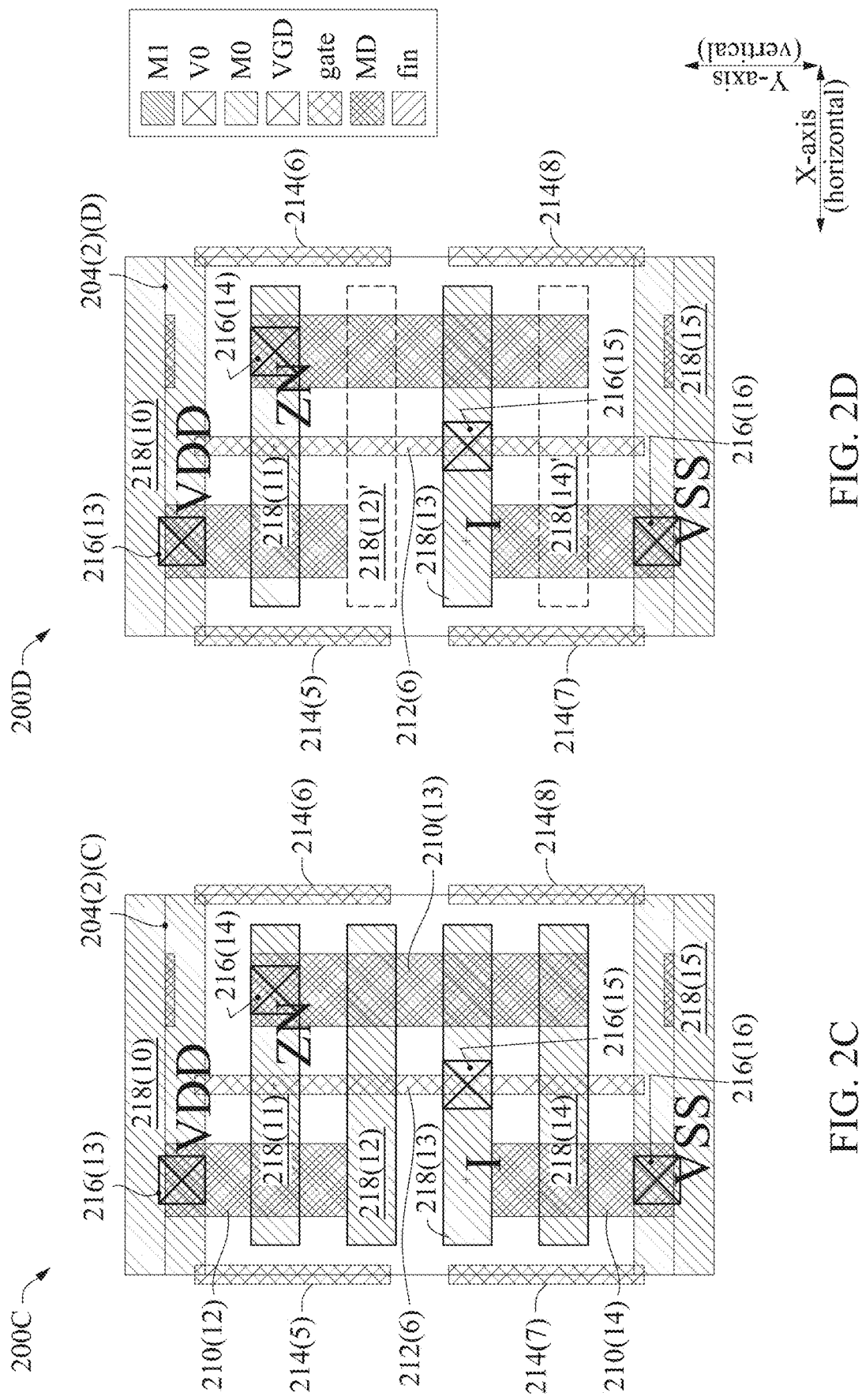

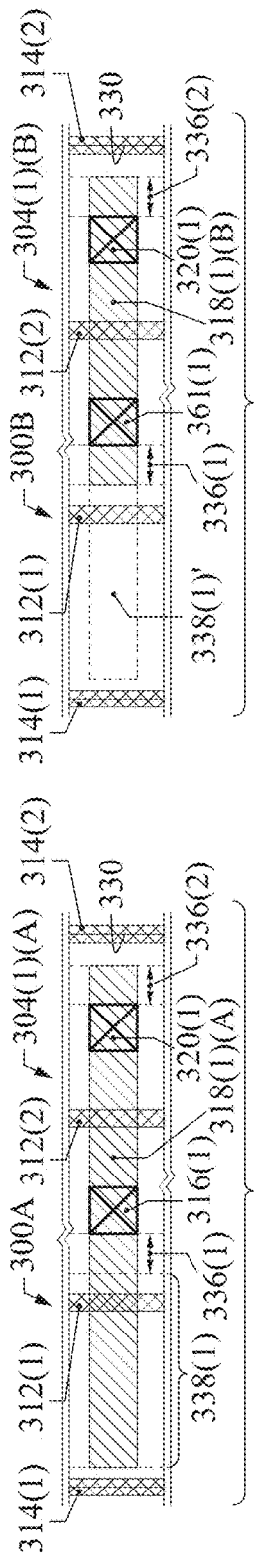
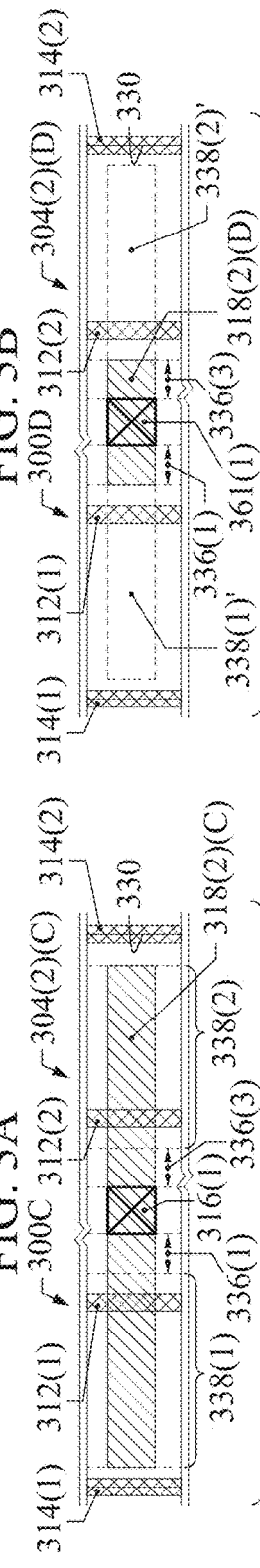
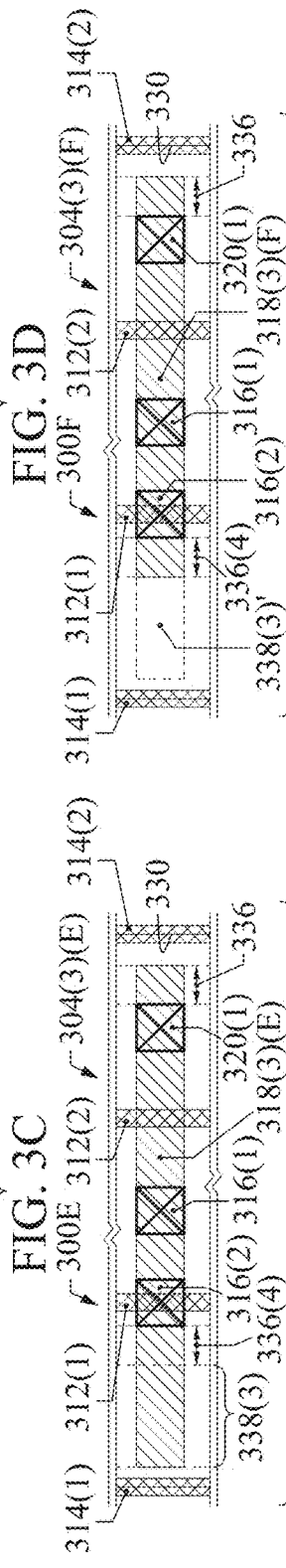
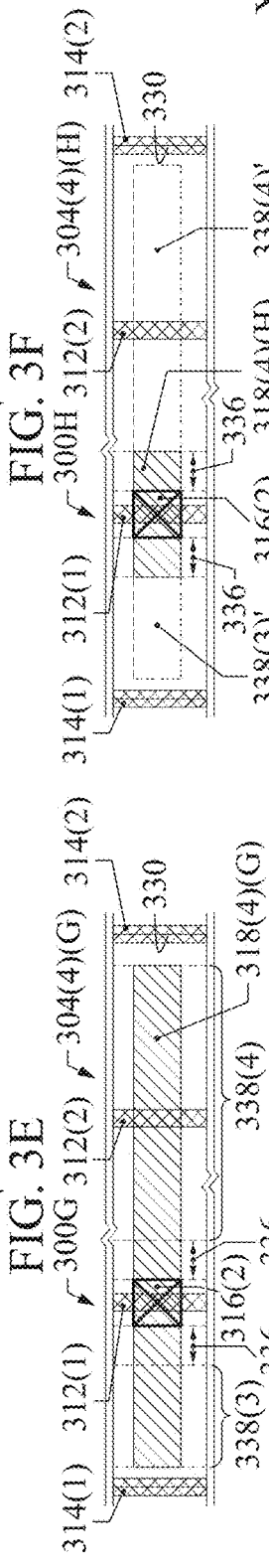
FIG. 3A  FIG. 3B  FIG. 3C  FIG. 3D  FIG. 3E  FIG. 3F  FIG. 3G  FIG. 3H

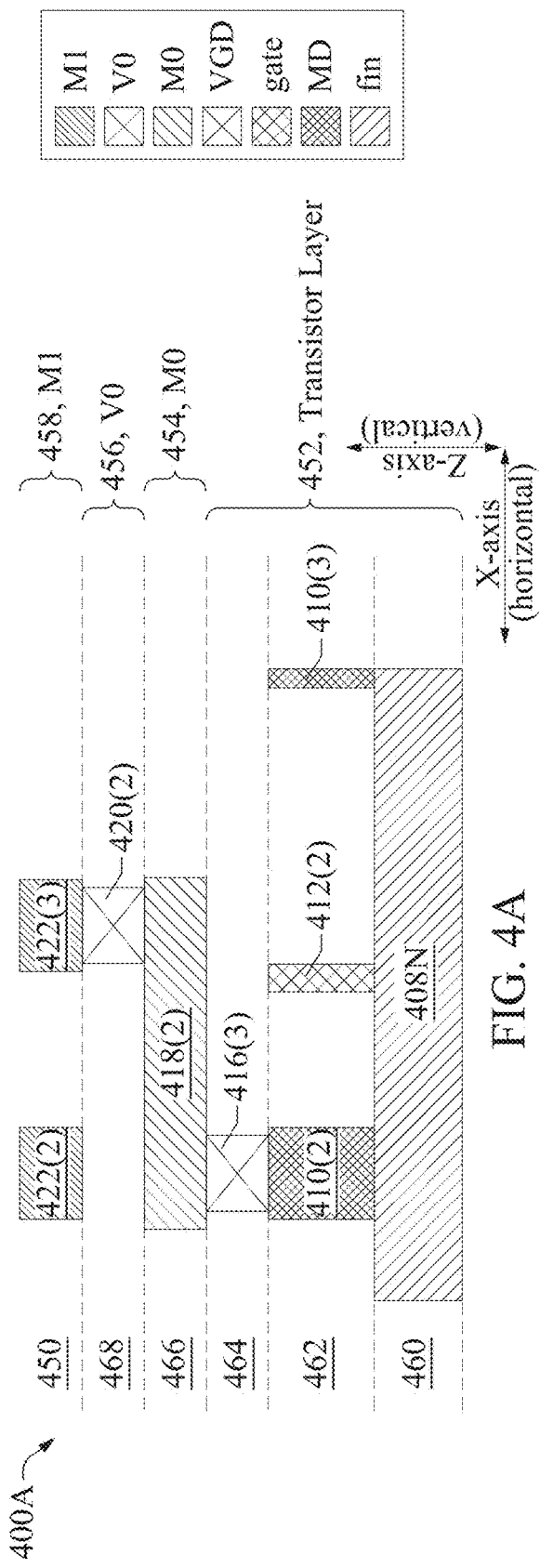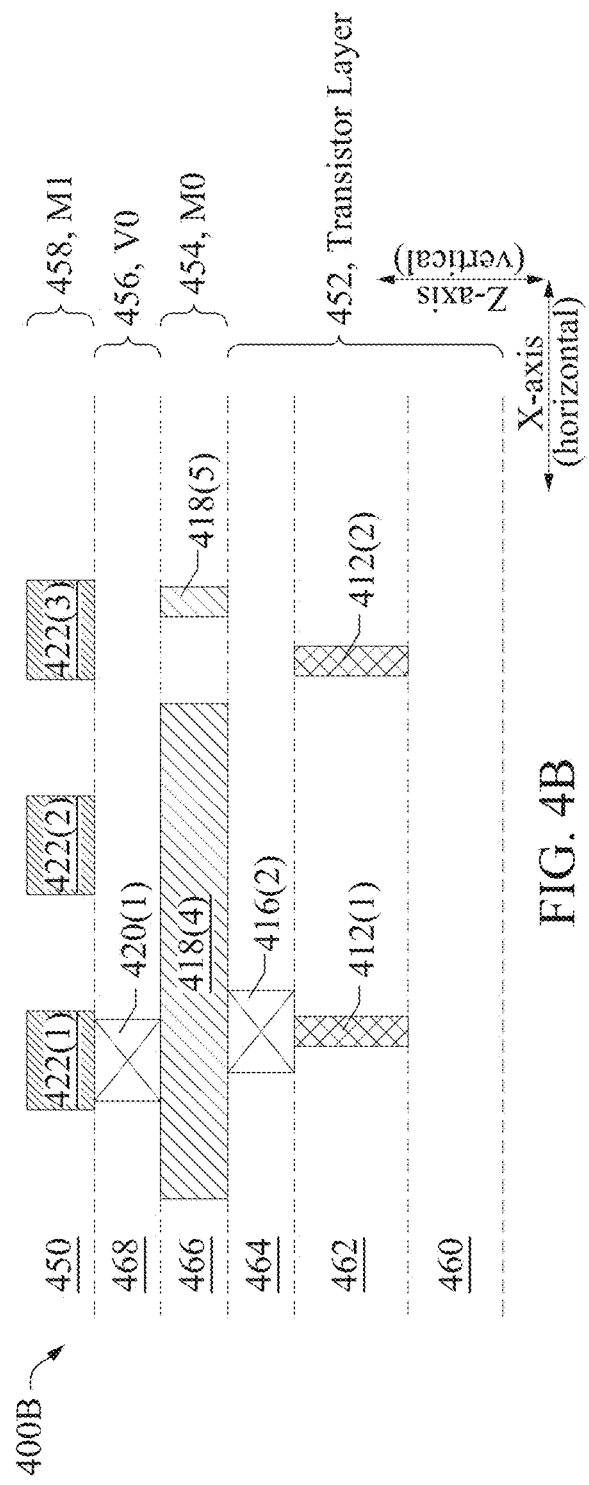
FIG. 4A
FIG. 4B

502
generate layout diagram

602
select a candidate pattern which is first conductive pattern in M_2nd level or M_1st level of layout diagram

604
determine that candidate pattern satisfies one or more criteria

606
change size of candidate pattern thereby revising layout diagram

FIG. 6A

ROUTING-RESOURCE-IMPROVING METHOD OF GENERATING LAYOUT DIAGRAM, SYSTEM FOR SAME AND SEMICONDUCTOR DEVICE

PRIORITY CLAIM AND CROSS-REFERENCE

This application is a divisional application of U.S. patent application Ser. No. 16/558,214, filed Sep. 2, 2019, now U.S. Pat. No. 11,232,248, issued Jan. 25, 2022, which claims priority to U.S. Provisional Patent Application Ser. No. 62/739,053 filed Sep. 28, 2018, each of which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process technology node by which will be fabricated a semiconductor device based on a layout diagram. The design rule set compensates for variability of the corresponding process technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2F are corresponding layout diagrams 200A-200F, in accordance with some embodiments.

FIGS. 3A-3H are corresponding layout diagrams 300A-300H, in accordance with some embodiments.

FIGS. 4A-4D are corresponding cross-sectional views 400A-400D, in accordance with some embodiments.

FIGS. 6A-6E are corresponding flowcharts of corresponding methods, in accordance with some embodiments.

DETAILED DESCRIPTION

Figure 1:
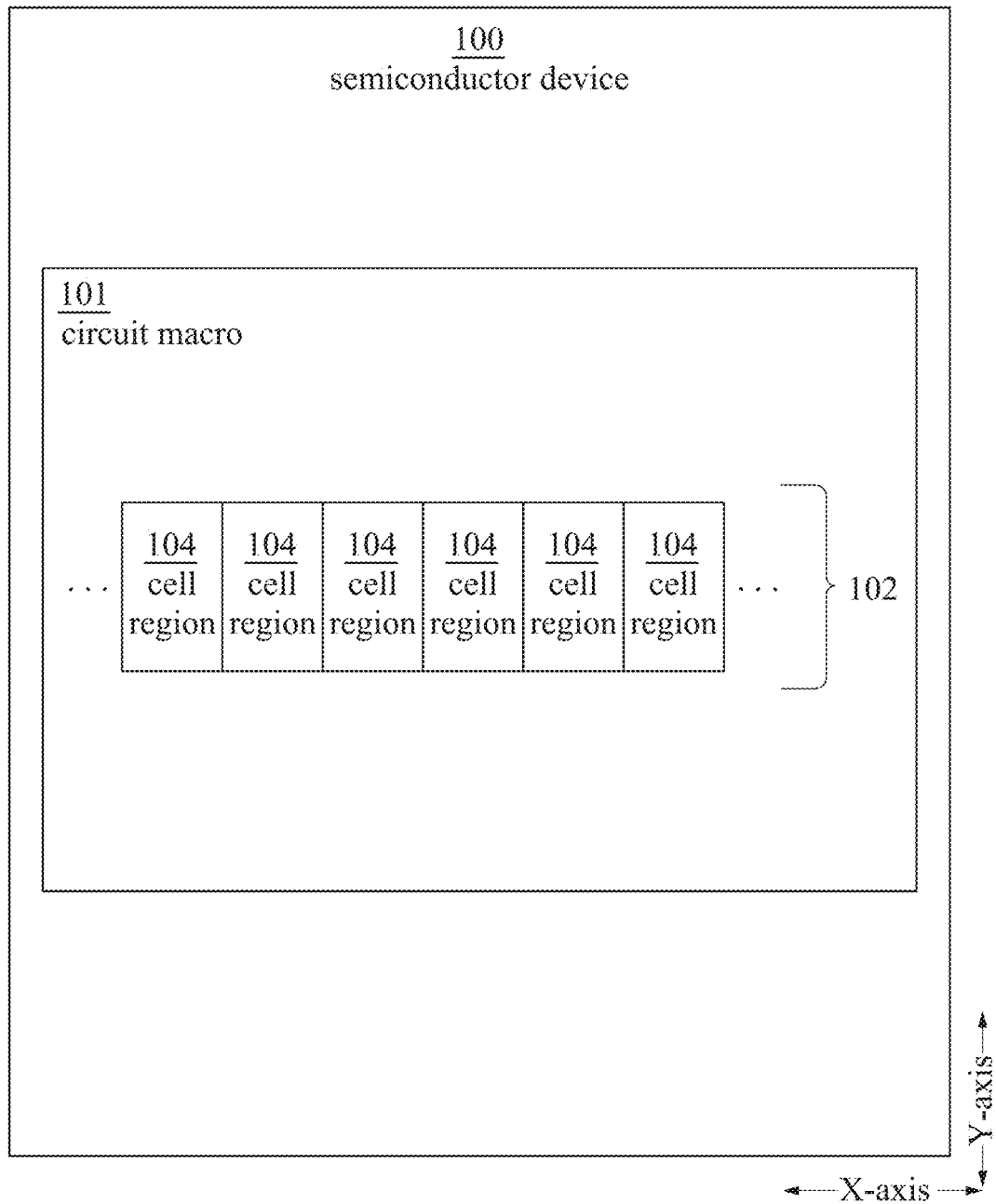
FIG. 1 is a block diagram, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate relationships between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For some embodiments, generating a layout diagram includes: selecting a candidate pattern in the layout diagram, e.g., an M1 pattern or an M0 pattern; determining that the candidate pattern satisfies one or more criteria; and changing a size of the candidate pattern thereby revising the layout diagram, which improves an M0 routing resource. In some embodiments, the context for generating the layout diagram is a first Design Rule (Design Rule 1), a Design Rule 2, a Design Rule 3 or a Design Rule 4. In some embodiments in which the context is Design Rule 3, the size of the candidate pattern is changed by reducing the size of the candidate pattern. In some embodiments in which the context is Design Rule 1 or Design Rule 2, the size of the candidate pattern is changed by removing the candidate pattern from the layout diagram. In some embodiments in which the context is Design Rule 4, the size of the candidate pattern is changed by increasing the size of the candidate pattern.

FIG. 1 is a block diagram of a semiconductor device 100 in accordance with some embodiments.

In FIG. 1, semiconductor device 100 includes, among other things, a circuit macro (hereinafter, macro) 101. In some embodiments, macro 101 is a logic macro. In some embodiments, macro 101 is an SRAM macro. In some embodiments, macro 101 is a macro other than a logic macro or an SRAM macro. Macro 101 includes, among other things, one or more cell regions 104 arranged in a row 102. In some embodiments, each cell region 104 is implemented based on a layout diagram resulting from one or more of the design rules disclosed herein and so has an improved M0 routing resource.

Figure 2A:
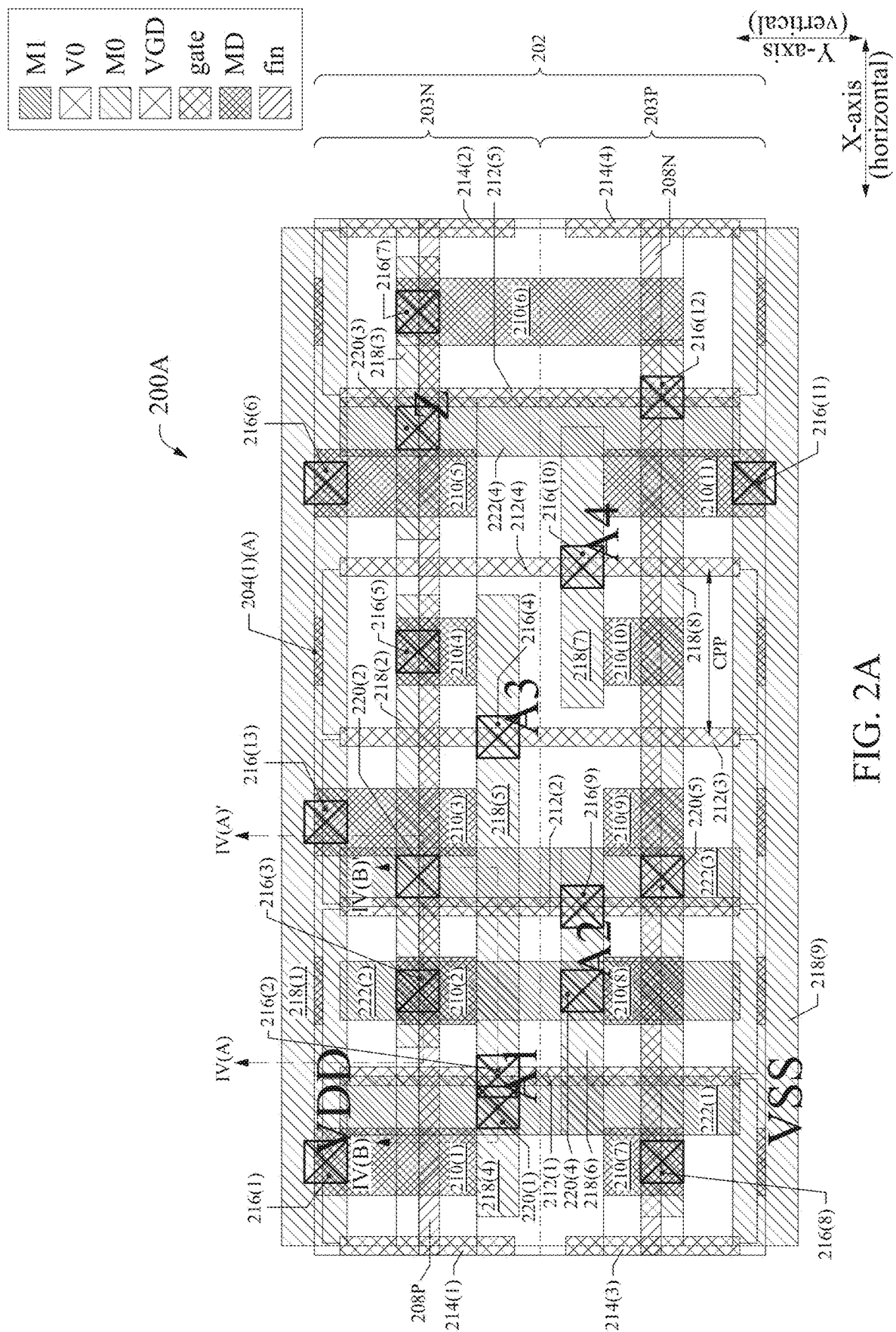
Figure 2B:
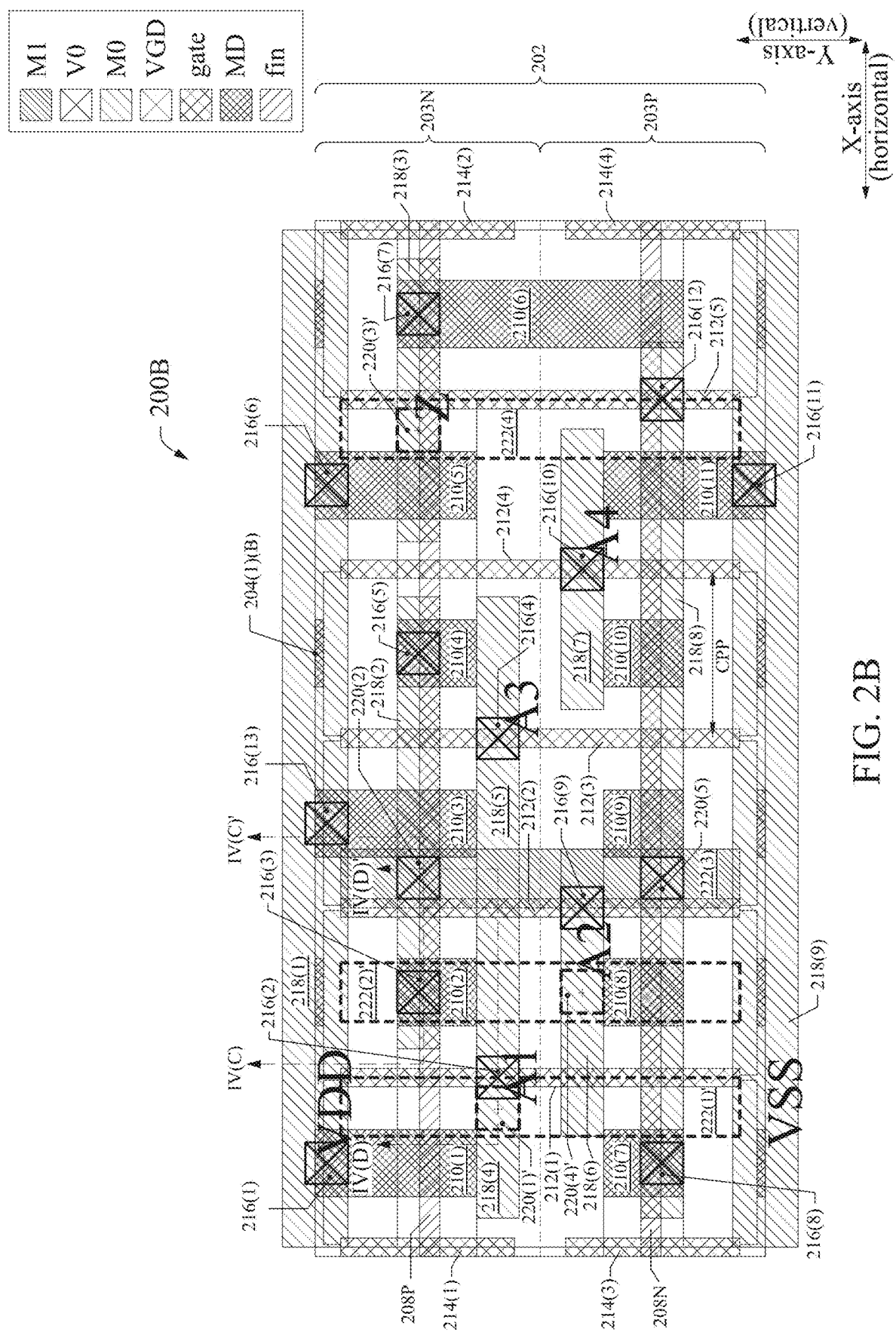

FIGS. 2A-2B are corresponding layout diagrams 200A-200B, in accordance with some embodiments.

Layout diagram 200A represents an initial layout diagram and layout diagram 200B represents a corresponding layout diagram resulting from one or more methods disclosed herein, in accordance with some embodiments.

FIGS. 2A-2B assume an orthogonal XYZ coordinate system in which the X-axis, Y-axis and Z-axis represent corresponding first, second and third directions. In some embodiments, the first, second and third directions correspond to a different orthogonal coordinate system than the XYZ coordinate system.

In FIG. 2A, layout diagram 200A includes a cell 204(1) (A). Cell 204(1)(A) represents a cell region in a semiconductor device based on layout diagram 200A. Cell 204(1) (A) is disposed in a row 202, which extends substantially in the first direction (extends horizontally). Though not shown for simplicity of illustration, in some embodiments, row 202 includes additional instances of cells, e.g., cell 204(1)(A) and/or other cells. Row 202 includes sub-rows 203N and 203P.

Layout diagram 200A further includes: active area patterns 208P and 208N; MD patterns 210(1), 210(2), 210(3), 210(4), 210(5), 210(6), 210(7), 210(8), 210(9), 210(10) and 210(11); gate patterns 212(1), 212(2), 212(3), 212(4), 212 (5), 214(1), 214(2), 214(3), and 214(4); VGD patterns 216(1), 216(2), 216(3), 216(4), 216(5), 216(6), 216(7), 216(8), 216(9), 216(10), 216(11), 216(12) and 216(13); M0 patterns 218(1), 218(2), 218(3), 218(4), 218(5), 218(6), 218(7), 218(8) and 218(9); VIA0 patterns 220(1), 220(2), 220(3), 220(4) and 220(5); and M1 patterns 222(1), 222(2), 222(3) and 222(4). In some embodiments, cell 204(1)(A) includes: active area patterns 208P and 208N; MD patterns 210(1)-210(11); gate patterns 212(1)-214(4); VGD patterns 216(1)-216(12); M0 patterns 218(2)-218(8); portions of M0 patterns 218(1) and 218(9); VIA0 patterns 220(1)-220(5); and M1 patterns 222(1)-222(4).

In the example of FIG. 2A, it is assumed that: M0 patterns 218(1) and 218(9) are power grid (PG) patterns that represent corresponding conductors in a power grid of a semiconductor device which is fabricated based on layout diagram 200A; and M0 patterns 218(2)-218(8) are routing patterns that represent non-PG conductors of a semiconductor device which is fabricated based on layout diagram 200A. In some embodiments, PG pattern 218(1) is designated for providing a first system reference voltage and PG pattern 218(9) is designated for providing a second system reference voltage. In FIG. 2A, PG pattern 218(1) is designated for providing VDD and PG pattern 218(9) is designated for providing VSS. In some embodiments, PG pattern 218(1) is designated for providing VSS and PG pattern 218(9) is designated for providing VDD. In some embodiments, PG patterns 218(1) and 218(9) are designated for providing corresponding voltages other than correspondingly VDD and VSS or correspondingly VSS and VDD.

Active area patterns 208P and 208N, MD patterns 210 (1)-210(11), gate patterns 212(1)-212(5) and 214(1)-214(4), and VGD patterns 216(1)-216(12) are included in a transistor level of layout diagram 200A, which corresponds to a transistor layer of a semiconductor device based on layout diagram 200A. M0 patterns 218(1)-218(9) are included in a level M0 of metallization in layout diagram 200A, which corresponds to a layer M0 of metallization of a semiconductor device based on layout diagram 200A. VIA0 patterns 220(1)-220(5) are included in a level V0 of interconnection in layout diagram 200A, which corresponds to a layer V0 of interconnection of a semiconductor device based on layout diagram 200A. M1 patterns 222(1)-222(4) are included in an M1 level of metallization, which corresponds to a layer M1 of metallization of a semiconductor device based on layout diagram 200A.

MD patterns 210(1)-210(11) and gate patterns 212(1)-212 (5) and 214(1)-214(4) are located over corresponding portions of active area patterns 208P and 208N. In some embodiments, active area patterns 208P and 208N are located over a substrate pattern (not shown). VGD patterns 216(1)-216(12) are located over corresponding portions of MD patterns 210(1)-210(7) and 210(11) and gate patterns 212(1)-212(5). M0 patterns 218(1)-218(9) are located over corresponding VGD patterns 216(1)-216(12). VIA0 patterns 220(1)-220(5) are located over corresponding M0 patterns 218(2)-218(5) and 218(7). M1 patterns 222(1)-222(4) are located over corresponding VIA0 patterns 220(1)-220(5).

Layout diagram 200A assumes a corresponding semiconductor process technology node which includes various design rules for generating a layout diagram. Layout diagram 200A further assumes that the design rules follow a numbering convention in which a first level of metallization (M_1st) and a corresponding first level of interconnect structures (V_1st) are referred to correspondingly as M0 and V0. Levels M0 and V0 of layout diagram 200A correspondingly represent layer M0 of metallization and layer V0 of interconnect structures in a semiconductor device based on layout diagram 200A. In some embodiments, the numbering convention assumes that the M_1st level and the V_1st level are referred to correspondingly as M1 and V1.

Active area patterns 208P and 208N and M0 patterns 218(1)-218(9) have corresponding long axes extending substantially along the X-axis (extending horizontally). MD patterns 210(1)-210(11), gate patterns 212(1)-212(5) and 214(1)-214(4), and M1 patterns 222(1)-222(4) have corresponding long axes extending substantially along the Y-axis (extending vertically).

In FIG. 2A, active area patterns 208P and 208N represent corresponding NMOS and NMOS fins in a semiconductor device based on layout diagram 200A. Accordingly, active area patterns 208P and 208N are designated for corresponding NMOS finFET and NMOS finFET configuration, and are referred to as corresponding fin patterns 208P and 208N. In some embodiments, fin patterns 208P and 208N are designated correspondingly for NMOS and NMOS configuration. Though not shown for simplicity of illustration, in some embodiments, each of sub-row 203N and 203P includes two or more fin patterns correspondingly designated for NMOS finFET and NMOS finFET configuration. In some embodiments, active area patterns 208P and 208N are designated for planar transistor configuration and so represent corresponding active regions in a cell region based on cell 204(1)(A). In some embodiments, active area patterns 208P and 208N are designated for nano-wire configuration. In some embodiments, active area patterns 208P and 208N are designated for nano-sheet configuration. In some embodiments, active area patterns 208P and 208N are designated for Gate-All-Around (GAA) configuration. In some embodiments in which an active region is referred to as an oxide-dimensioned (OD) region, active area patterns 208P and 208N are referred to as corresponding OD patterns 208P and 208N.

In layout diagram 200A, MD patterns 210(1)-210(11) represent corresponding MD conductive structures in a transistor layer of a semiconductor device based on layout diagram 200A. Gate patterns 212(1)-212(5) and 214(1)-214 (4) represent corresponding gate structures in a transistor layer of a semiconductor device based on layout diagram 200A. VGD patterns 216(1)-216(12) represent corresponding VG or VD structures in a transistor layer of a semiconductor device based on layout diagram 200A. A VG structure (see FIG. 4B) electrically couples a gate structure to a corresponding M0 conductive segment. A VD structure (see FIG. 4A) electrically couples a drain/source structure to a corresponding M0 conductive segment. M0 patterns 218(1)-218(9) represent corresponding conductive segments in layer M0 of metallization of a semiconductor device based on layout diagram 200A. VIA0 patterns 220(1)-220(5) represent corresponding interconnect structures, e.g., vias, in a layer V0 of interconnection of a semiconductor device based on layout diagram 200A. M1 patterns 222(1)-222(4) represent corresponding conductive segments in a layer M1 of metallization of a semiconductor device based on layout diagram 200A.

In FIG. 2A, gate patterns 212(1)-212(5) are included in cell 204(1)(A). Relative to the X-axis, gate patterns 214(1)-214(4) are included in cell 204(1)(A). Relative to the Y-axis, gate patterns 214(1) and 214(3) are substantially collinear, and gate patterns 214(2) and 214(4) are substantially collinear. In some embodiments (not shown), gate patterns 214(1) and 214(3) are merged and overlaid with a cut-pattern which (in effect) results in two discrete gate patterns corresponding to gate patterns 214(1) and 214(3). In some embodiments (not shown), gate patterns 214(2) and 214(4) are merged and overlaid with a cut-pattern which (in effect) results in two discrete gate patterns corresponding to gate patterns 214(2) and 214(4).

Regarding layout diagram 200A, in some embodiments, gate patterns 212(1)-212(5) are active gate patterns. In some embodiments, gate patterns 214(1)-214(4) are designated correspondingly as active or dummy gate patterns. In some embodiments, gate patterns 212(1)-212(5) and 214(1)-214(4) are designated correspondingly as active or dummy gate patterns based on whether corresponding active area patterns 208P and 208N are, relative to the X-axis, substantially continuous or substantially discontinuous at a side boundary of cell 204(1)(A). In some embodiments, where an active area pattern is substantially continuous at a side boundary of cell 204(1)(A), the configuration is referred to as a continuous oxide diffusion (CNOD) configuration. In some embodiments in which there is a CNOD configuration, a region of the active area pattern overlapping a side boundary of the cell is designated for doping which results in a filler region in a corresponding semiconductor device. In some embodiments, where an active area pattern is substantially discontinuous at a side boundary of cell 204(1)(A), the configuration is referred to as a continuous poly over diffusion edge (CPODE) configuration. In some embodiments in which there is a CPODE configuration, an insulator pattern (not shown) is disposed over a region representing a break in the active area pattern at a side boundary of the cell. In some embodiments, an active gate pattern is designated to receive a signal related to the function of a circuit which cell 204(1)(A) represents. In some embodiments, relative to the X-axis, a dummy gate pattern represents a dummy gate structure which helps to provide isolation between the cell region corresponding to cell 204(1)(A) and a neighboring, e.g., abutting, cell region (not shown). In some embodiments, a dummy gate structure is configured to float and so the dummy gate pattern is correspondingly designated to float, e.g., in a circumstance of a CPODE configuration. In some embodiments, relative to the X-axis, a dummy gate structure is configured to receive a voltage which inhibits conduction in an underlying portion of the corresponding fin, e.g., inhibits an inversion layer in the underlying portion of the corresponding fin, and so the dummy gate pattern is correspondingly designated to receive a conduction-inhibiting voltage.

Relative to the X-axis gate patterns 212(1)-212(5) and 214(1)-214(4) are separated by a distance a uniform distance. In some embodiments, the uniform distance represents one contacted poly pitch (CPP) for the corresponding semiconductor process technology node, e.g., gate patterns 214(1) and 212(1) are separated by one CPP. Accordingly, relative to the X-axis, cell 204(1) has a width of 6 CPP.

Cell 204(1)(A) represents a circuit. In some embodiments, cell 204(1)(A) represents a circuit which provides a function. In some embodiments, cell 204(1)(A) represents a circuit which provides a logical function, and is referred to accordingly as a logic cell. In some embodiments, cell 204(1)(A) represents the logical function AND, e.g., a four input AND (AND4).

In some embodiments, at least one of cells 204(1)-204(2) represents a circuit which provides a function other than a logical function.

In the example of FIG. 2A, cell 204(1)(A) has input labels A1, A2, A3 and A4, and an output label Z, which represent corresponding input signals A1, A2, A3 and A4, and an output signal Z of a cell region in a semiconductor device corresponding to cell 204(1)(A). Input label A1 is diagrammatically coupled to gate pattern 212(1) through a diagrammatic path including gate pattern 212(1), VGD pattern 216(2), M0 pattern 218(4), VIA0 pattern 220(1) and M1 pattern 222(1). Input label A2 is diagrammatically coupled to gate pattern 212(2) through a diagrammatic path including gate pattern 212(2), VGD pattern 216(9), M0 pattern 218(6), VIA0 pattern 220(4) and M1 pattern 222(2). Input label A3 is diagrammatically coupled to gate pattern 212(3) through a diagrammatic path including gate pattern 212(3), VGD pattern 216(4) and M0 pattern 218(5). Input label A4 is diagrammatically coupled to gate pattern 212(4) through a diagrammatic path including gate pattern 212(4), VGD pattern 216(10) and M0 pattern 218(7).

Output label Z is diagrammatically coupled to MD pattern 210(6) through a diagrammatic path including MD pattern 210(6), VGD pattern 216(7), M0 pattern 218(3), VIA0 pattern 220(3) and M1 pattern 222(4).

Recalling that layout diagram 200A represents an initial layout diagram, it is also to be recalled that layout diagram 200B represents a corresponding layout diagram resulting from one or more methods disclosed herein, in accordance with some embodiments. More particularly, cell 204(1)(B) of layout diagram 200B represents having applied a method which includes a first design rule (Design Rule 1) (discussed below) to layout diagram 200A, in accordance with some embodiments. An example of a cell region corresponding to cell 204(1)(B) is cell region 104 of FIG. 1.

Layout diagram 200B is similar to layout diagram 200A. FIG. 2B follows a similar numbering convention to that of FIG. 2A. For brevity, the discussion will focus more on differences between FIG. 2B and FIG. 2A than on similarities.

In FIG. 2B, some patterns have been removed as compared to FIG. 2A. In particular, VIA0 patterns 220(1), 220(4) and 220(3) of FIG. 2A have been removed in FIG. 2B, as indicated by corresponding phantom shapes 220(1)', 220(4)' and 220(3)'. Also, M1 patterns 222(1), 222(2) and 222(4) of FIG. 2A have been removed in FIG. 2B, as indicated by corresponding phantom shapes 222(1)', 222(2)' and 222(4)'.

In some embodiments, Design Rule 1 is as follows: if a sole VIA0 pattern is overlapped by a given M1 pattern, then remove the given M1 pattern. More particularly, the given M1 pattern is a part of a diagrammatic path which includes the given M1 pattern, the sole VIA0 pattern, and a corresponding underlying M0 pattern.

In some embodiments, Design Rule 1 is as follows: for a first M1 pattern which is designated as a pin pattern, if a first VIA0 pattern is the sole VIA0 pattern which is overlapped by a first M1 pattern, then remove the first M1 pattern and instead designate the corresponding underlying first M0 pattern as the pin pattern.

In some embodiments, designation as a pin pattern is to be understood as follows: for a first conductive pattern in a first level of metallization M_1st which has a corresponding overlying first level of interconnection V_1st, the designation of the first conductive pattern as a pin pattern indicates that there are at least first and second permissible overlying locations for a corresponding first via pattern in level V_1st at which at least corresponding second and third conductive patterns in a second level of metallization could be located so as to overlap the first via pattern. For example, for a first M0 pattern and a corresponding overlying first VIA0 pattern, if there are multiple locations for the first V1A0 pattern at which corresponding M1 patterns could be located so as to overlap the first V1A0 pattern, then the first M0 pattern is designated as a pin pattern. For example, for a first M1 pattern and a corresponding overlying first VIA1 pattern, if there are multiple locations for the first V1A1 pattern at which corresponding M2 patterns could be located so as to overlap the first V1A1 pattern, then the first M1 pattern is designated as a pin pattern. In some embodiments, relationships of a given M0/M1 pattern with respect to overlying patterns are analyzed to determine if the given M0/M1 is to be designated as a pin pattern. In some embodiments, a status of being designated as a pin pattern is a property associated with a given M0/M1 pattern such that inspecting properties of the given M1 pattern reveals whether the given M1 pattern is a pin pattern.

In FIG. 2A, M1 patterns 222(1), 222(2) and 222(4), and M0 patterns 218(5) and 218(7), are designated as pin patterns. As such, regarding M1 pattern 222(1), there are multiple permissible overlying locations for a corresponding via pattern VIA1(1) (not shown) at which corresponding M2 patterns (not shown) could be located so as to overlap via pattern V1A1(1). Regarding M1 pattern 222(2), there are multiple permissible overlying locations for a corresponding via pattern VIA1(2) (not shown) at which corresponding M2 patterns (not shown) could be located so as to overlap via pattern V1A1(2). Regarding M1 pattern 222(4), there are multiple permissible overlying locations for a corresponding via pattern VIA1(3) (not shown) could be located so as to overlap via pattern V1A1(3).

In layout diagram 200A, among the M1 patterns designated as pin patterns, each of M1 patterns 222(1), 222(2) and 222(4) overlaps only one VIA0 pattern, namely corresponding VIA0 patterns 220(1), 220(4) and 220(3). Accordingly, Design Rule 1 applies to each of M1 patterns 222(1), 222(2) and 222(4).

Results of having applied Design Rule 1 to FIG. 2A are shown in FIG. 2B. Cell 204(1))(B) of layout diagram 200B is a result of having applied a method which includes Design Rule 1 to layout diagram 200A, and more particularly to M1 patterns 222(1), 222(2) and 222(4). Results of having applied Design Rule 1 to FIG. 2A include: VIA0 patterns 220(1), 220(4) and 220(3) and M1 patterns 222(1), 222(2) and 222(4) having been removed from FIG. 2B as indicated by corresponding phantom shapes 220(1)', 220(4)', 220(3)', 222(1)', 222(2)' and 222(4)'; and M0 patterns 218(4), 218(6), 218(5), 218(7) and 218(3) having been designated as pin patterns.

In FIG. 2B, the designation of M0 pattern 218(4) as a pin pattern indicates that there are multiple permissible overlying locations for a corresponding via pattern 220(1)" (not shown) at which corresponding M1 patterns, e.g., 222(1)" (not shown) could be located so as to overlap via pattern 220(1)". In FIG. 2B, the designation of M0 pattern 218(6) as a pin pattern indicates that there are multiple permissible overlying locations for a corresponding via pattern 220(4)" (not shown) at which corresponding M1 patterns, e.g., 222(2)" (not shown) could be located so as to overlap via pattern 220(4)". In FIG. 2B, the designation of M0 pattern 218(5) as a pin pattern indicates that there are multiple permissible overlying locations for a corresponding via pattern VIA(4) (not shown) at which corresponding M1 patterns (not shown) could be located so as to overlap via pattern VIA(4). In FIG. 2B, the designation of M0 pattern 218(7) as a pin pattern indicates that there are multiple permissible overlying locations for a corresponding via pattern VIA(5) (not shown) at which corresponding M1 patterns (not shown) could be located so as to overlap via pattern VIA(5). In FIG. 2B, the designation of M0 pattern 218(3) as a pin pattern indicates that there are multiple permissible overlying locations for a corresponding via pattern 220(3)" (not shown) at which corresponding M1 patterns, e.g., 222(4)" (not shown) could be located so as to overlap via pattern 220(4)".

By having removed M1 patterns 222(1), 222(2) and 222(4) and VIA0 patterns 220(1), 220(4) and 220(3), layout diagram 200B is less congested as compared to layout diagram 200A. By having removed M1 patterns 222(1), 222(2) and 222(4) and VIA0 patterns 220(1), 220(4) and 220(3), layout diagram 200B has an improved M1 routing resource as compared to layout diagram 200A. In some embodiments, because layout diagram 200B has fewer M1 patterns than layout diagram 200A, layout diagram 200B is regarded as having an improved routing resource relative to layout diagram 200A. In some embodiments, reduced congestion in level M1 results in reduced congestion in level M2. In some embodiments, congestion in level M2 is reduced by ($\approx 3\%$)-($\approx 4\%$).

FIGS. 2C-2D are corresponding layout diagrams 200C-200D, in accordance with some embodiments.

Layout diagram 200C represents an initial layout diagram and layout diagram 200D represents a corresponding layout diagram resulting from one or more methods disclosed herein, in accordance with some embodiments. More particularly, cell 204(2))(D) of layout diagram 200D represents having applied a method which includes a second design rule (Design Rule 2) (discussed below) to layout diagram 200C, in accordance with some embodiments. An example of a cell region corresponding to cell 204(2)(D) is cell region 104 of FIG. 1.

Layout diagrams 200C-200D are similar to layout diagrams 200A-200B of corresponding FIGS. 2A-2B. FIGS. 2C-2D follow a similar numbering convention to that of FIGS. 2A-2B. Though corresponding, some components also differ. To help identify components which correspond but nevertheless have differences, the numbering convention uses parenthetical numbers. For example, pattern 218(10) in FIG. 2C and pattern 218(1) in FIG. 2B are both M0 patterns, with similarities being reflected in the common root 218(_), and with the differences being reflected in the parentheticals _(10) and _(1). For brevity, the discussion will focus more on differences between FIGS. 2C-2D and FIGS. 2A-2B than on similarities.

In FIG. 2C, layout diagram 200C includes a cell 204(2) (C). Layout diagram 200A further includes: MD patterns 210(10), 210(11), 210(12), 210(13), 210(14) and 210(15); gate patterns 212(6), 214(5), 214(6), 214(7), and 214(8); VGD patterns 216(13), 216(14), 216(15) and 216(16); and M0 patterns 218(10), 218(11), 218(12), 218(13), 218(14) and 218(15). For simplicity of illustration, among other patterns, fin patterns and M1 patterns are omitted from FIGS. 2C-2D. In some embodiments, cell 204(2)(C) includes: MD patterns 210(10)-210(15); gate patterns 212(6) and 214(5)-214(8); VGD patterns 216(13)-216(16); M0 patterns 218(11)-218(14); and portions of M0 patterns 218(10) and 218(15).

In some embodiments, cells 204(2)(C) and 204(2)(D) of corresponding FIGS. 2C and 2D are inverter cells representing corresponding inverter circuits.

In FIG. 2D, some patterns have been removed as compared to FIG. 2C. In particular, M0 patterns 218(12) and 218(14) of FIG. 2C have been removed in FIG. 2D, as indicated by corresponding phantom shapes 218(12)' and 218(14)' in FIG. 2D.

In some embodiments, Design Rule 2 is as follows: if a given M0 pattern does not overlap one or more VGD contact patterns and if the given M0 pattern is not overlapped by one or more V0 contact patterns, then remove the given M0 pattern. More particularly, the given M0 pattern is not a part of a diagrammatic path which includes the given M0 pattern and one or more VGD patterns, nor is the given M0 pattern a part of a diagrammatic path which includes the given M0 pattern and one or more VIA0 patterns.

In FIG. 2C, M0 pattern 218(12) does not overlap one or more VGD contact patterns and nor is M0 pattern 218(12) overlapped by one or more V0 contact patterns. Accordingly, Design Rule 2 applies to M0 pattern 218(12). Similarly, in FIG. 2C, M0 pattern 218(14) does not overlap one or more VGD contact patterns and nor is M0 pattern 218(14) overlapped by one or more V0 contact patterns. Accordingly, Design Rule 2 applies to M0 pattern 218(14).

Results of having applied Design Rule 2 to FIG. 2C are shown in FIG. 2D. Cell 204(2))(D) of layout diagram 200D is a result of having applied a method which includes Design Rule 2 to layout diagram 200C, and more particularly to M0 patterns 218(12) and 218(14). Results of having applied Design Rule 1 to FIG. 2C include: M0 patterns 218(12) and 218(14) having been removed from FIG. 2D, as indicated by corresponding phantom shape 218(12)' in FIG. 2D; and M0 pattern 218(14) having been removed from FIG. 2D, as indicated by corresponding phantom shape 218(14)' in FIG. 2D.

By having removed M0 patterns 218(12) and 218(14), layout diagram 200D is less congested as compared to layout diagram 200C. By having removed M0 patterns 218(12) and 218(14), layout diagram 200D has an improved M0 routing resource as compared to layout diagram 200C. In some embodiments, because layout diagram 200D has fewer M0 patterns than layout diagram 200C, layout diagram 200D is regarded as having an improved M0 routing resource relative to layout diagram 200C.

Figures 2E, 2F:
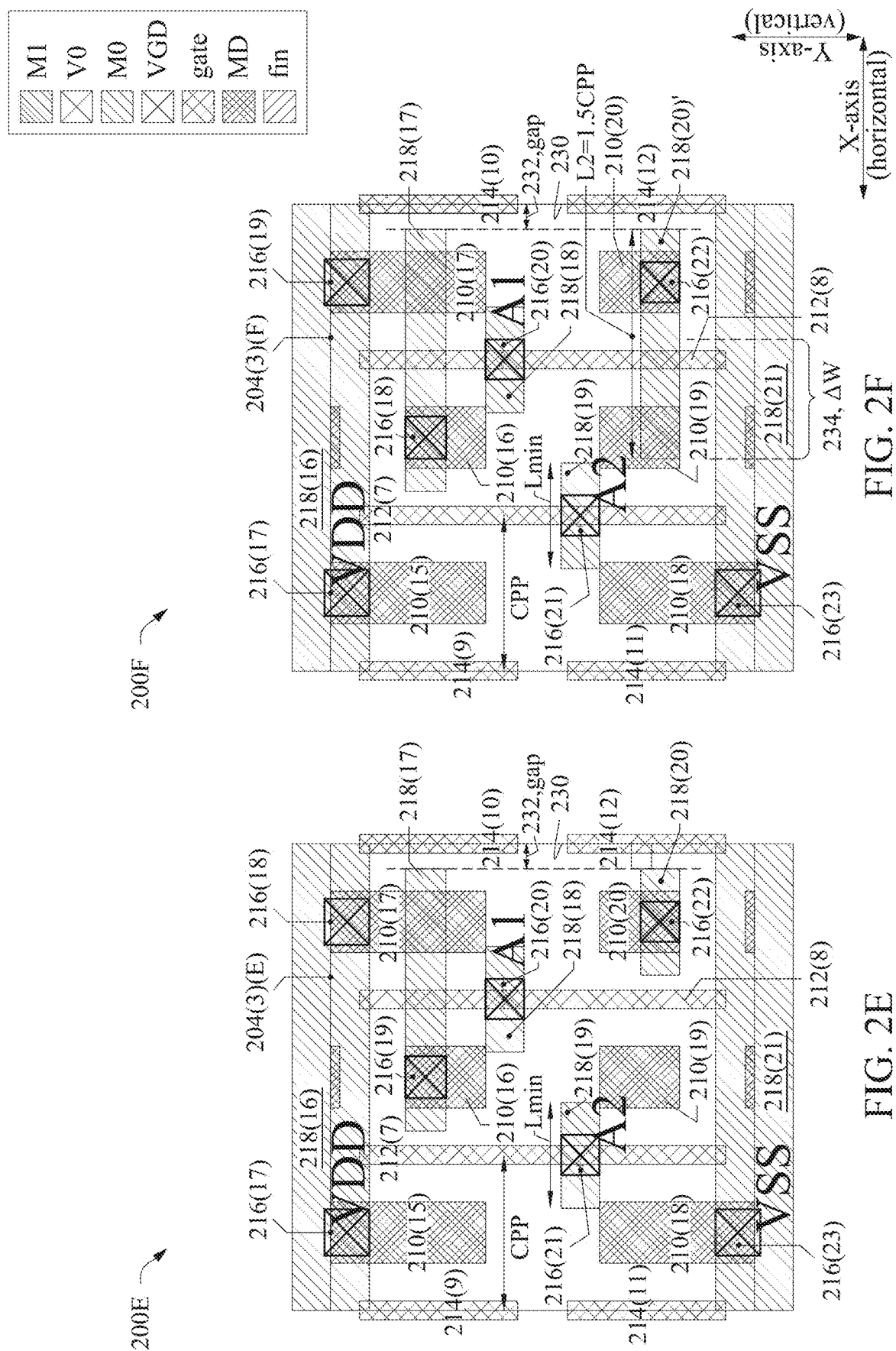

FIGS. 2E-2F are corresponding layout diagrams 200E-200F, in accordance with some embodiments.

Layout diagram 200E represents an initial layout diagram and layout diagram 200F represents a corresponding layout diagram resulting from one or more methods disclosed herein, in accordance with some embodiments. More particularly, cell 204(3))(F) of layout diagram 200F represents having applied a method which includes a fourth design rule (Design Rule 4) (discussed below) to layout diagram 200E, in accordance with some embodiments. An example of a cell region corresponding to cell 204(3)(F) is cell region 104 of FIG. 1.

Layout diagrams 200E-200F are similar to layout diagrams 200A-200D of corresponding FIGS. 2A-2D. FIGS. 2E-2F follow a similar numbering convention to that of FIGS. 2A-2D. Though corresponding, some components also differ. To help identify components which correspond but nevertheless have differences, the numbering convention uses parenthetical numbers. For example, pattern 218(16) in FIG. 2E and pattern 218(10) in FIG. 2D are both M0 patterns, with similarities being reflected in the common root 218(_), and with the differences being reflected in the parentheticals _(16) and _(10). For brevity, the discussion will focus more on differences between FIGS. 2E-2F and FIGS. 2A-2D than on similarities.

In FIG. 2E, layout diagram 200E includes a cell 204(3)(E). Layout diagram 200E further includes: MD patterns 210(17), 210(18), 210(19), 210(20), and 210(21); gate patterns 212(7), 212(8), 214(9), 214(10), 214(11), and 214(12); VGD patterns 216(17), 216(18), 216(19), 216(2), 216(21), 216(22) and 216(23); and M0 patterns 218(16), 218(17), 218(18), 218(19), 218(20) and 218(21). For simplicity of illustration, among other patterns, fin patterns, VIA0 patterns and M1 patterns are omitted from FIGS. 2C-2D. In some embodiments, cell 204(2)(C) includes: MD patterns 210(17)-210(21); gate patterns 212(7)-212(8) and 214(9)-214(12); VGD patterns 216(17)-216(23); M0 patterns 218(17)-218(20); and portions of M0 patterns 218(16) and 218(21).

Cell 204(3)(E) represents a circuit. In some embodiments, cell 204(3)(E) represents a circuit which provides a function. In some embodiments, cell 204(3)(E) represents a circuit which provides a logical function, and is referred to accordingly as a logic cell. In some embodiments, cell 204(3)(E) represents the logical function NAND, e.g., a two-input NAND (NAND2).

In layout diagram 200E, relative to the X-axis, MD patterns 210(17)-210(21) are arranged according to a grid of imaginary tracks which are substantially parallel to the Y-axis. In some embodiments, relative to the X-axis, a pitch of the tracks (PT) is PT≈CPP, and as such immediately adjacent MD patterns are one track away from each other. In some embodiments, a pitch of the tracks (PT) is PT≈½CPP, and as such immediately adjacent MD patterns are two tracks away from each other. In some embodiments, relative to the X-axis, a width of each MD pattern, e.g., MD pattern 210(1) is WMD≈⅓CPP.

Relative to the X-axis, in some embodiments in which a pitch of the tracks (PT) is PT≈CPP, long axes of corresponding MD patterns 210(15) and 210(18) are substantially collinear with a first track, long axes of MD patterns 210(16) and 210(19) are substantially collinear with a second track, and long axes of corresponding MD patterns 210(17) and 210(19) are substantially collinear with a third (and last) track.

Relative to the X-axis, in some embodiments in which a pitch of the tracks (PT) is PT≈CPP, the tracks define MD-columns. As such MD patterns 210(15) and 210(18) are located in a first MD-column, MD patterns 210(16) and 210(19) are located in a second MD-column, and MD patterns 210(17) and 210(19) are located in a third (and last) MD-column.

In FIG. 2E, M0 patterns 218(17)-218(20) are internal to cell 204(3)(E). Relative to the X-axis, one end of each of M0 patterns 218(17) and 218(20) is located proximal to side boundary 230 of cell 204(3)(E).

In some embodiments, relative to the X-axis, in order to help provide isolation between a first cell region corresponding to cell 204(3)(E) and a neighboring, e.g., abutting, second cell region (not shown) disposed to the right of side boundary 230 of the first cell region, a gap 232 is provided between a right end of each of M0 patterns 218(17) and 218(20) and side boundary 230 of cell 204(3)(E). In some embodiments, a length of gap 232, L232, is L232≈(⅙)CPP.

In layout diagram 200E, relative to the X-axis, M0 patterns 218(18), 218(19) and 218(20) each have a width substantially equal to a minimum width L min for level M0. Relative to a typical fabrication tolerance of a semiconductor process technology node which produces a semiconductor device, the minimum width L min represents a minimum length of a conductive segment in layer M0 in the semiconductor device. The minimum width L min is less than CPP, L min<CPP. In some embodiments, L min is based on a pitch of cut-M0 (CM0) patterns (not shown). In some embodiments, L min≈⅔CPP.

In some embodiments, Design Rule 4 is as follows: if a given MD pattern is located in a first MD-column or a last MD-column of the cell, and if the given MD pattern is overlapped by a corresponding VGD pattern, and if the corresponding M0 pattern which overlaps the corresponding VGD pattern is not a PG pattern, then a width (relative to the X-axis) of the corresponding M0 pattern is set to be at least L2, where CPP<L2. In some embodiments, L2≈1.5CPP.

In FIG. 2E, MD patterns 210(15) and 210(18) are located in the first MD-column, and MD patterns 210(17) and 210(20) are located in the last MD-column. Each of MD patterns 210(15), 210(17), 210(18) and 210(20) is overlapped by a VGD pattern, namely corresponding VGD patterns 216(17), 216(18), 216(23) and 216(22).

In layout diagram 200E, MD pattern 210(20) is overlapped by M0 pattern 218(20), the latter not being a PG pattern. Accordingly, Design Rule 4 applies to MD pattern 210(20).

Results of having applied Design Rule 4 to FIG. 2E are shown in FIG. 2F. Cell 204(3))(F) of layout diagram 200F is a result of having applied a method which includes Design Rule 4 to layout diagram 200E, and more particularly to M0 pattern 218(20). Results of having applied Design Rule 4 to FIG. 2E include having changed M0 pattern 218(20) of FIG. 2E to be M0 pattern 218(20)' in FIG. 2F. The increase in width of M0 pattern 218(20)', ΔW, is shown in FIG. 2F as reference number 234. In some embodiments, relative to the X-axis, L2 represents a minimum separation distance between CM0 patterns (not shown) for a corresponding semiconductor process technology node By having increased the width of M0 pattern 218(20)' sufficiently to be designated a pin pattern, layout diagram 200F has an improved M0 routing resource as compared to layout diagram 200E. In some embodiments, because designation of a given M0 pattern as a pin pattern improves routability, and because layout diagram 200F has one additional M0 pattern which can be designated as a pin pattern as compared to layout diagram 200E, layout diagram 200F is regarded as having an improved M0 routing resource relative to layout diagram 200E.

FIGS. 3A-3H are corresponding layout diagrams 300A-300H, in accordance with some embodiments.

Layout diagrams 300A, 300C, 300E and 300G represent initial layout diagrams, and layout diagrams 300B, 200D, 300F and 300H represent corresponding layout diagrams resulting from one or more methods disclosed herein (post-method layout diagrams), in accordance with some embodiments. For example, layout diagram 300A represents an initial layout diagram and layout diagram 300B represents a corresponding post-method layout diagram resulting from one or more methods disclosed herein, in accordance with some embodiments. More particularly, cell 304(1)(B) of layout diagram 300B represents having applied a method which includes a third design rule (Design Rule 3) (discussed below) to layout diagram 300A of FIG. 3A, in accordance with some embodiments. An example of a cell region corresponding to cells 304(1)(B), 304(2)(D), 304(3) (F) and 304(4)H is cell region 104 of FIG. 1.

Layout diagrams 300A-300H are similar to layout diagrams 200A-200F of corresponding FIGS. 2A-2F. FIGS. 3A-3H follow a similar numbering convention to that of FIGS. 2A-2F. Though corresponding, some components also differ. Whereas FIGS. 2A-2F use 2-series numbers, FIGS. 3A-3H use 3-series numbers. To help identify components which correspond but nevertheless have differences, the numbering convention uses parenthetical numbers. For example, pattern 318(1)(A)in FIG. 3A and pattern 218(11) in FIG. 2C are both M0 patterns, with similarities being reflected in the common root _18(_), and with the differences being reflected in the series number 3_(_)(_) and 2_(_) and in the parentheticals _(1)(_) and _(11). To help reflect differences between corresponding initial and post-method layout diagrams, some of the elements include a second parenthetical. For example, pattern 318(1)(A)in FIG. 3A and pattern 318(1)(B) in FIG. 3B are both M0 patterns, with the differences being reflected in the second parenthetical _(_) (A) and _(_)(B). For brevity, the discussion will focus more on differences between FIGS. 3A-3H and FIGS. 2A-2F than on similarities.

In FIG. 3A, layout diagram 300A includes portion of a cell 304(1)(A). Layout diagram 300A further includes: gate patterns 312(1), 312(2), 314(1) and 314(2); VGD pattern and 316(1); M0 pattern 318(1)(A); and VIA0 pattern 320(1). For simplicity of illustration, among other patterns, fin patterns, MD patterns and M1 patterns are omitted from FIGS. 2C-2D. In some embodiments, cell 304(1)(A) includes: gate patterns 312(1)-312(2) and 314(1)-314(2); VGD pattern 316(1); and M0 pattern 318(1)(A).

In layout diagram 300A, VGD pattern 316(1) is overlapped by M0 pattern 318(1)(A), and M0 pattern 318(1)(A) is overlapped by VIA0 pattern 320(1). Relative to the horizontal direction, a first portion of M0 pattern 318(1)(A) extends to the right of VIA0 pattern 320(1) by a width 336(2).

The first portion of M0 pattern 318(1)(A) overhangs the right side of VIA0 pattern 320(1) by width 336(2), and accordingly width 336(2) is referred to as overhang (OH) 336(2). In some embodiments, OH 336(_), e.g., OH 336(1), OH 336(2), or the like, represents a minimum width (relative to the X-axis) WOH of overhang in a semiconductor device that can be produced within a typical fabrication tolerance by a corresponding semiconductor process technology node, e.g., an overhang of a first VIA0 structure by a corresponding first conductive segment in layer M0, where the first VIA0 structure is represented by VIA0 pattern 320(1) and the first conductive segment in layer M0 is represented by M0 pattern 318(1)(A). In some embodiments, (≈0.2CPP) ≤WOH≤(≈0.3CPP). In some embodiments, relative to a typical fabrication tolerance of a semiconductor process technology node which produces a semiconductor device, if a minimum height H min (relative to the Y-axis) of a M0 segment in the semiconductor is (≈20 nm)<H min, then WOH≈0.2CPP. In some embodiments, if the minimum height H min of the corresponding semiconductor process technology node is (≈9 nm)≤H min≤(≈20 nm), then WOH≈0.3CPP. In some embodiments, where an M0 pattern overhangs a corresponding VIA0 pattern and a width of the overhanging portion of the M0 pattern is approximately OH 336(_), then the overhanging portion is referred to as a stub portion.

Relative to the horizontal direction, a second portion of M0 pattern 318(1)(A) extends to the left of VGD pattern 316(1) by width 336(1), and a third portion 338(1) of M0 pattern 318(1)(A) extends to the left of the second portion of M0 pattern 318(1)(A).

In some embodiments, Design Rule 3 is as follows: relative to the X-axis, if a given M0 pattern overlaps a given VGD pattern or is overlapped by a given VIA0 pattern, then first and second wing portions (to the extent present) of the given M0 pattern are reduced to corresponding first and second stub portions, where (A) the first wing portion extends to the left of the leftmost via pattern (be it either a VG pattern or a VIA0 pattern) by an amount greater than OH 336(_), (B) the second wing portion extends to the right of the rightmost via pattern (be it either a VG pattern or a VIA0 pattern) by an amount greater than OH 336(_), (C) the first stub portion extends to the left of the leftmost via pattern (be it either a VG pattern or a VIA0 pattern) and has a width substantially equal to OH 336(_), and (D) the second stub portion extends to the right of the rightmost via pattern (either a VG pattern or a VIA0 pattern) and has a width substantially equal to OH 336(_). In some embodiments, reducing a wing portion of a given M0 pattern to a stub portion is referred to as trimming the wing portion.

In FIG. 3A, relative to overhang by M0 pattern 318(1)(A), the leftmost via pattern is VGD pattern 316(1). The first wing portion of M0 pattern 318(1)(A) corresponds to a combination of third portion 338(1) of M0 pattern 318(1)(A) and the second portion of M0 pattern 318(1)(A) which extends to the left of VGD pattern 316(1) by width 336(1).

The first wing portion extends to the left of VGD pattern 316(1) by an amount greater than OH 336(2). Accordingly, Design Rule 3 applies to the first wing portion of M0 pattern 318(1)(A). In particular, the amount by which the first wing portion of M0 pattern 318(1)(A) extends beyond OH 336(2) equals the width of third portion 338(1) of M0 pattern 318(1)(A).

In layout diagram 300A, relative to overhang by M0 pattern 318(1)(A), the rightmost via pattern is VIA0 pattern 320(1). The second wing portion of M0 pattern 318(1)(A) corresponds to the second portion of M0 pattern 318(1)(A). The second wing portion of M0 pattern 318(1)(A) extends to the right of VIA0 pattern 320(1) but not by an amount greater than OH 336(2). Accordingly, Design Rule 3 does not apply to the second wing portion of M0 pattern 318(1)(A).

Results of having applied Design Rule 3 to FIG. 3A are shown in FIG. 3B. Cell 304(1))(B) of layout diagram 300B is a result of having applied a method which includes Design Rule 3 to layout diagram 300A, and more particularly to the first wing portion of M0 pattern 318(1)(A). Results of having applied Design Rule 3 to FIG. 3A include: narrower (relative to the X-axis) M0 pattern 318(1)(B) having replaced wider M0 pattern 318(1)(A). M0 pattern 318(1)(B) is narrower than M0 pattern 318(1)(A) because third portion 338(1) of M0 pattern 318(1)(A) has been removed from FIG. 3A, as indicated by corresponding phantom shape 338(1)' in FIG. 3B.

By having removed third portion 338(1) of M0 pattern 318(1)(A), layout diagram 300B is less congested as compared to layout diagram 300A. By having removed third portion 338(1) of M0 pattern 318(1)(A), layout diagram 300B has an improved M0 routing resource as compared to layout diagram 300A. In some embodiments, because M0 pattern 318(1)(B) of layout diagram 300B is narrower than M0 pattern 318(1)(A) of layout diagram 300A, layout diagram 300B is regarded as having an improved M0 routing resource relative to layout diagram 300A.

Regarding FIGS. 3C and 3D, it is to be recalled that cell 304(2)(D) of layout diagram 300D represents having applied a method which includes Design Rule 3 to layout diagram 300C of FIG. 3C, in accordance with some embodiments.

In layout diagram 300C, relative to overhang by M0 pattern 318(2)(C), the leftmost via pattern is VIA0 pattern 316(1) such that the first wing portion of M0 pattern 318(2)(C) is the same as the first wing portion of M0 pattern 318(1)(A). Accordingly, Design Rule 3 applies to the first wing portion of M0 pattern 318(2)(C).

In layout diagram 300C, relative to overhang by M0 pattern 318(2)(C), the rightmost via pattern is VGD pattern 316(1). Regarding M0 pattern 318(2)(C), a fourth portion of M0 pattern 318(2)(C) extends to the right of VGD pattern 316(1) by width 336(3), and a fifth portion 338(2) of M0 pattern 318(2)(C) extends to the right of the fourth portion of M0 pattern 318(2)(C). The second wing portion of M0 pattern 318(2)(C) corresponds to a combination of fifth portion 338(2) of M0 pattern 318(2)(C) and the fourth portion of M0 pattern 318(2)(C). The second wing portion extends to the right of VGD pattern 316(1) by an amount greater than OH 336(3). Accordingly, Design Rule 3 applies to the second wing portion of M0 pattern 318(2)(C). In particular, the amount by which the second wing portion of M0 pattern 318(2)(C) extends beyond OH 336(3) equals the width of fifth portion 338(2) of M0 pattern 318(2)(C).

Results of having applied Design Rule 3 to FIG. 3C are shown in FIG. 3D. Cell 304(2))(D) of layout diagram 300D is a result of having applied a method which includes Design Rule 3 to layout diagram 300D, and more particularly to the first and second wing portions of M0 pattern 318(2)(C). Results of having applied Design Rule 3 to FIG. 3C include: narrower (relative to the X-axis) M0 pattern 318(2)(D) having replaced wider M0 pattern 318(2)(C). M0 pattern 318(2)(D) is narrower than M0 pattern 318(2)(C) because third portion 338(1) and fifth portion 338(2) of M0 pattern 318(2)(C) have been removed from FIG. 3C, as indicated by corresponding phantom shapes 338(1)' and 338(2)' in FIG. 3D. In some embodiments, because M0 pattern 318(2)(D) of layout diagram 300D is narrower than M0 pattern 318(2)(C) of layout diagram 300C, layout diagram 300D is regarded as having an improved M0 routing resource relative to layout diagram 300C.

Results of having applied Design Rule 3 to FIG. 3E are shown in FIG. 3F. Cell 304(3))(F) of layout diagram 300F is a result of having applied a method which includes Design Rule 3 to layout diagram 300E, and more particularly to the first wing portions of M0 pattern 318(3)(E). Results of having applied Design Rule 3 to FIG. 3E include: narrower (relative to the X-axis) M0 pattern 318(3)(F) having replaced wider M0 pattern 318(3)(E). M0 pattern 318(3)(F) is narrower than M0 pattern 318(3)(E) because a portion 338(3) of M0 pattern 318(3)(E) has been removed from FIG. 3E, as indicated by corresponding phantom shape 338(3)' in FIG. 3F. In some embodiments, because M0 pattern 318(3)(F) of layout diagram 300F is narrower than M0 pattern 318(3)(E) of layout diagram 300E, layout diagram 300F is regarded as having an improved M0 routing resource relative to layout diagram 300E.

Results of having applied Design Rule 3 to FIG. 3G are shown in FIG. 3H. Cell 304(4))(H) of layout diagram 300H is a result of having applied a method which includes Design Rule 3 to layout diagram 300G, and more particularly to the first and second wing portions of M0 pattern 318(4)(G). Results of having applied Design Rule 3 to FIG. 3G include:

narrower (relative to the X-axis) M0 pattern 318(4)(H) having replaced wider M0 pattern 318(4)(G). M0 pattern 318(4)(H) is narrower than M0 pattern 318(4)(G) because a portion 338(3) and a portion 338(4) of M0 pattern 318(4)(G) have been removed from FIG. 3G, as indicated by corresponding phantom shape 338(3)' and 338(4)' in FIG. 3H. In some embodiments, because M0 pattern 318(4)(H) of layout diagram 300H is narrower than M0 pattern 318(4)(G) of layout diagram 300G, layout diagram 300H is regarded as having an improved M0 routing resource relative to layout diagram 300G.

Figure 4C:
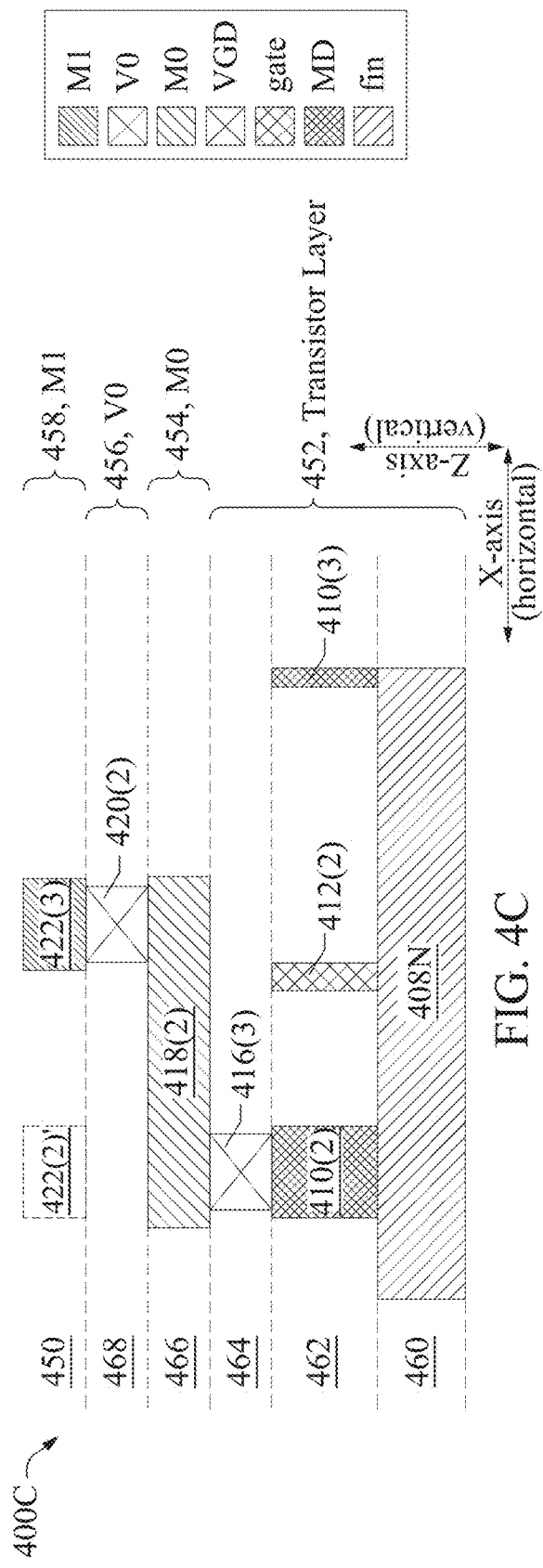

FIGS. 4A-4C are corresponding cross-sectional views 400A-400C of corresponding parts of corresponding semiconductor devices, in accordance with some embodiments.

More particularly, cross-sectional views 400A-400B show corresponding parts of a semiconductor device based on layout diagram 200A of FIG. 2A. Cross-sectional views 400C-400D show corresponding parts of a semiconductor device based on layout diagram 200 of FIG. 2B. The parts corresponding to cross-sectional views 400C-400D and the semiconductor device including the same are corresponding examples of cell region 104 and semiconductor device 100 of FIG. 1.

FIGS. 4A-4C assume an orthogonal XYZ coordinate system in which the X-axis, Y-axis and Z-axis represent corresponding first, second and third directions. In some embodiments, the first, second and third directions correspond to a different orthogonal coordinate system than the XYZ coordinate system.

Cross-sectional views 400A-400D follow a similar numbering convention to that of FIGS. 2A-2F. Whereas FIGS. 2A-2F use 2-series numbers, FIGS. 4A-4D use 4-series numbers. For example, fin 408N of FIG. 4A corresponds to fin pattern 208N of FIG. 2A.

In FIG. 4A, the part corresponding to cross-sectional view 400A includes a transistor layer 452, a M0 layer of metallization over transistor layer 452; a V0 layer 456 over M0 layer 454; and a M1 layer 458 over V0 layer 456.

Transistor layer 452 includes: a fin 408N; an interlayer dielectric (ILD) 460 in a sub-layer corresponding to fin 408N; a MD structure 410(2) on fin 408N; a gate structure 412(2) on fin 408N; an ILD 462 in a sub-layer corresponding to MD structure 410(2) and gate structure 412(2); a VGD structure 416(3) on MD structure 410(2); and an ILD 464 in a sub-layer corresponding to VGD structure 416(3). M0 layer 454 includes a conductive M0 segment 418(2), which is overlappingly on VGD structure 416(3), and an ILD 466. V0 layer 456 includes a VIA0 structure 420(2), which is on M0 segment 418(2), and an ILD 468. M1 layer 458 includes conductive M1 segments 422(2) and 422(3), the latter being overlapping on V0 420(2), and an ILD 450.

The long axis of fin 408N extends in a direction substantially parallel to the X-axis. Long axes of MD structure 410(2) and gate structure 412(2) extend in the Y-direction (not shown in FIG. 4A). Relative to the Z-axis, MD structure 410(2) and gate structure 412(2) are disposed on fin 408N.

A VGD structure, e.g., VGD structure 410(2), is a contact structure which electrically couples an overlapping conductive segment in layer M0, e.g., M0 segment 418(2), and an underlapping MD structure, e.g., MD structure 410(2), or an underlapping gate structure. In some embodiments, VGD is an acronym for the phrase via-gate or via-drain/source.

In FIG. 4B, regarding the part corresponding to cross-sectional view 400B, transistor layer 452 includes: interlayer dielectric (ILD) 460 in the sub-layer corresponding to fin 408N (not shown in FIG. 4B); gate structures 412(1) and 412(2); ILD 462; a VGD structure 416(2) on gate structure 412(1); and ILD 464. M0 layer 454 includes conductive M0 segments 418(4), which is overlappingly on VGD structure 416(2), and 418(5), and ILD 466. V0 layer 456 includes a VIA0 structure 420(1), which is on M0 segment 418(4), and ILD 468. M1 layer 458 includes conductive M1 segments 422(1), which is on VIA0 structure 420(1), 422(2) and 422(3), and ILD 450.

In FIG. 4C, some structures have been removed as compared to FIG. 4A. In particular, M1 pattern 422(2) of FIG. 4A has been removed in FIG. 4C, as indicated by corresponding phantom shape 422(2)'.

Figure 4D:
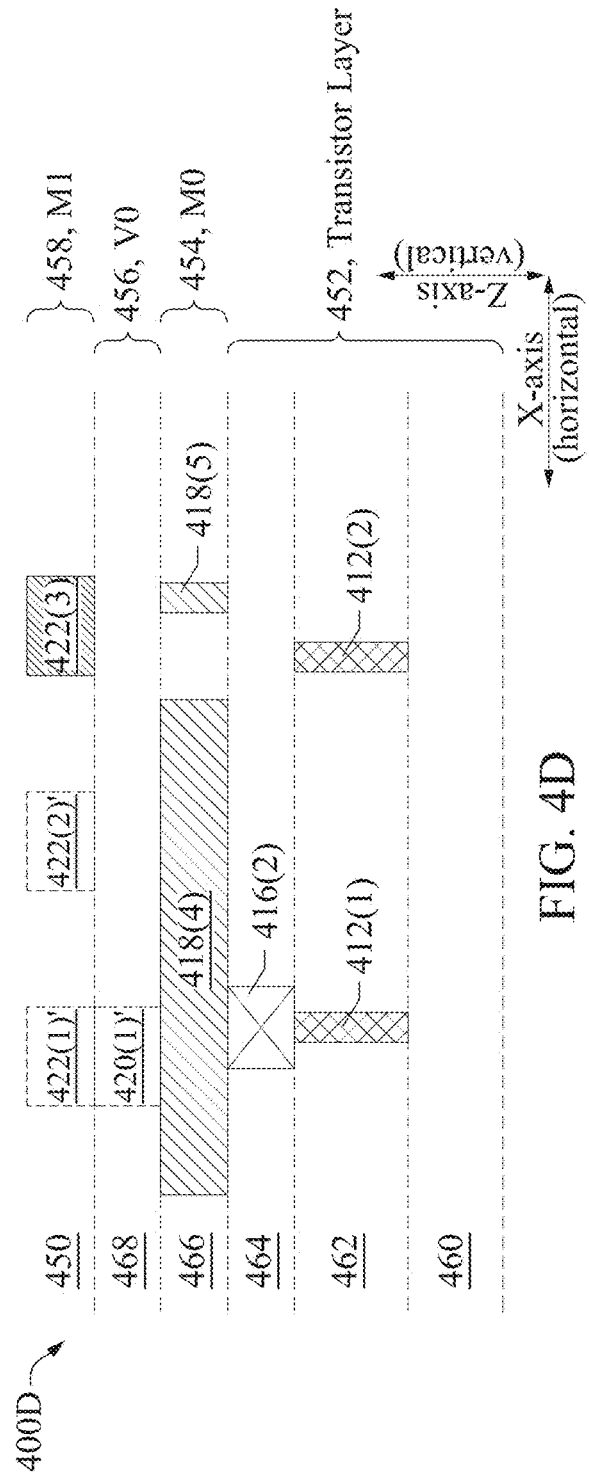

In FIG. 4D, some structures have been removed as compared to FIG. 4B. In particular, VIA0 pattern 420(1) of FIG. 4B has been removed in FIG. 4D, as indicated by corresponding phantom shape 420(1)'. Also, M1 patterns 422(1) and 222(2) of FIG. 4A have been removed in FIG. 4D, as indicated by corresponding phantom shapes 422(1)' and 422(2)'.

Figure 5:
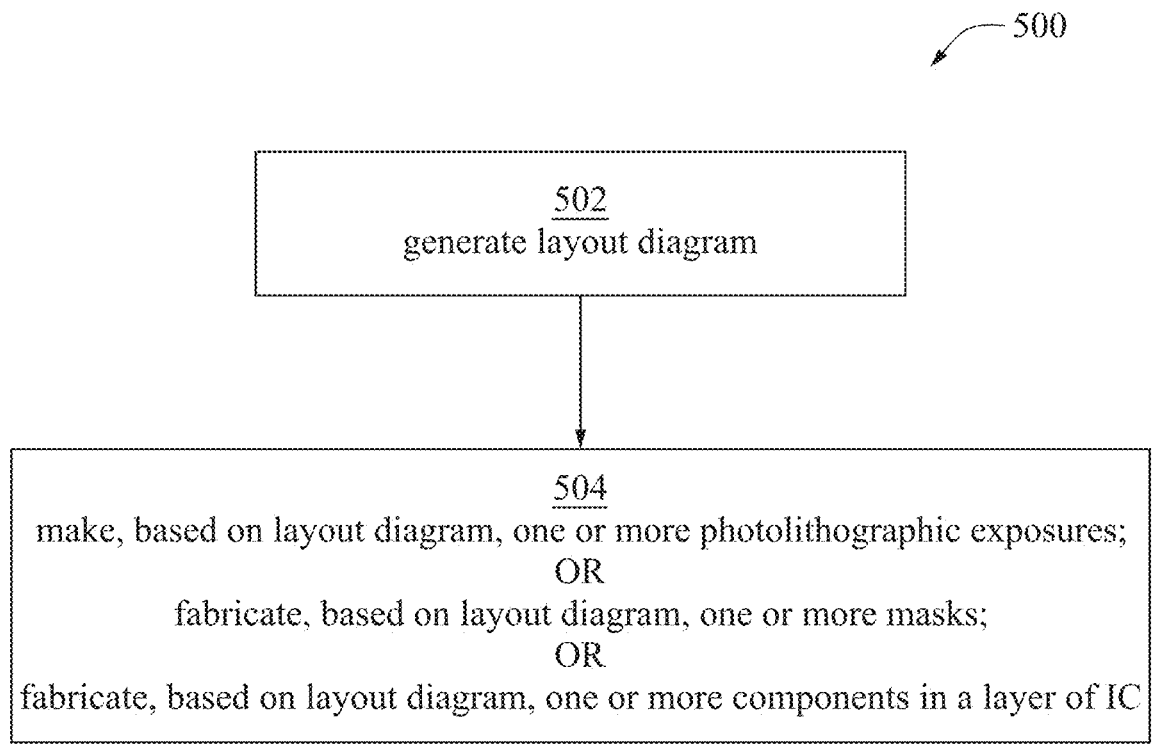
FIG. 5 is a flowchart of a method, in accordance with some embodiments.

FIG. 5 is a flowchart of a method 500 of manufacturing a semiconductor device, in accordance with some embodiments.

Examples of a semiconductor device which can be manufactured according to method 500 include semiconductor device 100 FIG. 1.

In FIG. 5, method 500 includes blocks 502-504. At block 502, a layout diagram is generated which, among other things, includes an arrangement which improves an M0 routing resource. An example of a semiconductor device including a cell region having an improved M0 routing resource corresponding to a layout generated by method 500 includes semiconductor device 100 of FIG. 1. Block 502 is discussed in more detail below with respect to FIG. 6A. From block 502, flow proceeds to block 504.

At block 504, based on the layout diagram, at least one of (A) one or more photolithographic exposures are made or (B) one or more semiconductor masks are fabricated or (C) one or more components in a layer of a semiconductor device are fabricated. See discussion below of FIG. 8.

FIG. 6A is a flowchart of a method of generating a layout diagram, in accordance with some embodiments.

More particularly, the method of FIG. 6A shows block 502 of FIG. 5 in more detail, in accordance with one or more embodiments.

Examples of layout diagrams which can be generated according to the method of FIG. 6A include the layout diagrams disclosed herein, or the like. In some embodiments, the layout diagrams and corresponding versions thereof are stored on a non-transitory computer-readable medium, e.g., stored as layout diagram(s) 708 in computer-readable medium 704 of FIG. 7 (discussed below). The method of FIG. 6A is implementable, for example, using EDA system 700 (FIG. 7, discussed below), in accordance with some embodiments. Examples of a semiconductor device which can be manufactured based on layout diagrams generated according to the method of FIG. 6A include semiconductor device 100 FIG. 1, and semiconductor devices based on layout diagrams 200B, 200D, 200F, 300B, 300D, 300F, 300G, or the like.

In FIG. 6A, block 502 includes blocks 602-606. At block 602, a candidate pattern is selected which is a first conductive pattern in a M_2nd level or a M_1st level of the layout diagram. In some embodiments, the M_2nd level is the M0 level and the M_1st level is the M0 level. Examples of patterns in the M_2nd level include M1 patterns 222(1), 222(2) and 222(4) in the M1 level of FIG. 2A, or the like. Examples of patterns in the M_1st level include M0 patterns 218(12) and 218(14) in the M0 level of FIG. 2C, M0 pattern 218(20) in the M0 level of FIG. 2F, M0 pattern 318(1)(A) in the M0 level of FIG. 3A, M0 pattern 318(2)(C) in the M0 level of FIG. 3C, M0 pattern 318(3)(E) in the M0 level of FIG. 3E, M0 pattern 318(4)(G) in the M0 level of FIG. 3G, or the like. From block 602, flow proceeds to block 604.

At block 604, it is determined that the candidate pattern satisfies one or more criteria. Examples of the criteria are the criteria of corresponding Design Rules 1, 2, 3 or 4, or the like. From block 604, flow proceeds to block 606.

At block 606, the size of the candidate pattern is changed. In some embodiments, the size of the candidate pattern is changed by being reduced, e.g., as in FIGS. 3B, 3D, 3F, or 3H, or the like. In some embodiments, the size of the candidate pattern is changed by removing the candidate pattern from the layout diagram, e.g., as in FIGS. 2B, 2D, or the like. In some embodiments, the size of the candidate pattern is changed by being increased, e.g., as in FIG. 2F, or the like.

Figure 6B:
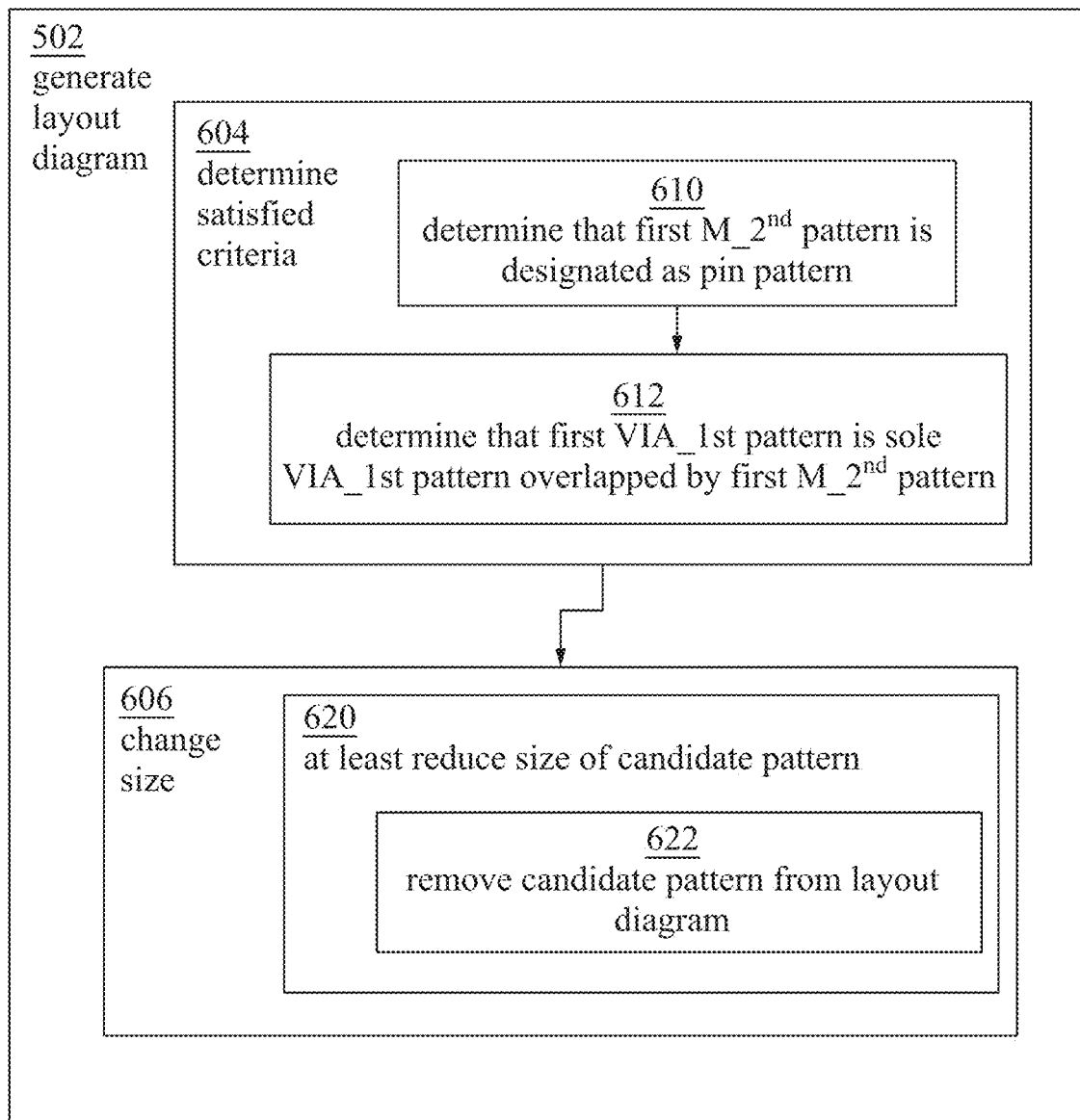

FIG. 6B is a flowchart of a method of generating a layout diagram, in accordance with some embodiments.

More particularly, the method of FIG. 6B shows blocks 604 and 606 of FIG. 6A correspondingly in more detail, in accordance with one or more embodiments. A context of FIG. 6B is Design Rule 1.

An example of a layout diagram which can be generated according to the method of FIG. 6B is layout diagram 200B, or the like. Examples of a semiconductor device which can be manufactured based on layout diagrams generated according to the method of FIG. 6B include semiconductor device 100 FIG. 1, a semiconductor device based on layout diagram 200B, or the like.

In FIG. 6B, block 604 includes blocks 610-622. In blocks 610-622, the candidate pattern is the first M_2nd pattern. At block 610, it is determined that the first M_2nd pattern is designated as a pin pattern. Examples of M_2nd patterns which are designated as pin patterns include M1 patterns 222(1), 222(2) and 222(4).

In some embodiments, relationships of a given M1 pattern with respect to overlying patterns are analyzed to determine if the given M1 is to be designated as a pin pattern. In some embodiments, a status of being designated as a pin pattern is a property associated with a given M1 pattern such that inspecting properties of the given M1 pattern reveals whether the given M1 pattern is a pin pattern. From block 610, flow proceeds to block 612.

At block 612, it is determined that a first via pattern in the 1st level (first VIA_1st pattern) of interconnection is a sole VIA_1st pattern which is overlapped by the first M_2nd pattern. Continuing the example of M1 pattern 222(1) as a pin pattern, VIA0 pattern 222(1) is the sole VIA0 pattern overlapped by M1 pattern 222(2). From block 612, flow exits block 604 and proceeds to block 606.

In FIG. 6B, block 606 includes block 620. At block 620, the size of the candidate pattern is at least reduced. Block 620 includes block 622. At block 622, the candidate pattern is removed from the layout diagram. An example of removing the candidate pattern is the removal of M1 pattern 222(1) from FIG. 2B as indicated by corresponding phantom shape 222(1)' in FIG. 2B. In some embodiments, the corresponding via pattern is also removed, e.g., VIA0 pattern 220(1) as indicated by corresponding phantom shape 220(1)' in FIG. 2B.

In some embodiments, after having removed the candidate pattern, the method further includes designating a corresponding underlying first pattern in the first level (first M_1st pattern) instead as a pin pattern. An example of an M_1st pattern designated instead as a pin pattern is M0 pattern 218(4) of FIG. 2B being designated as a pin pattern after corresponding M1 pattern 222(1) was removed.

Figure 6C:
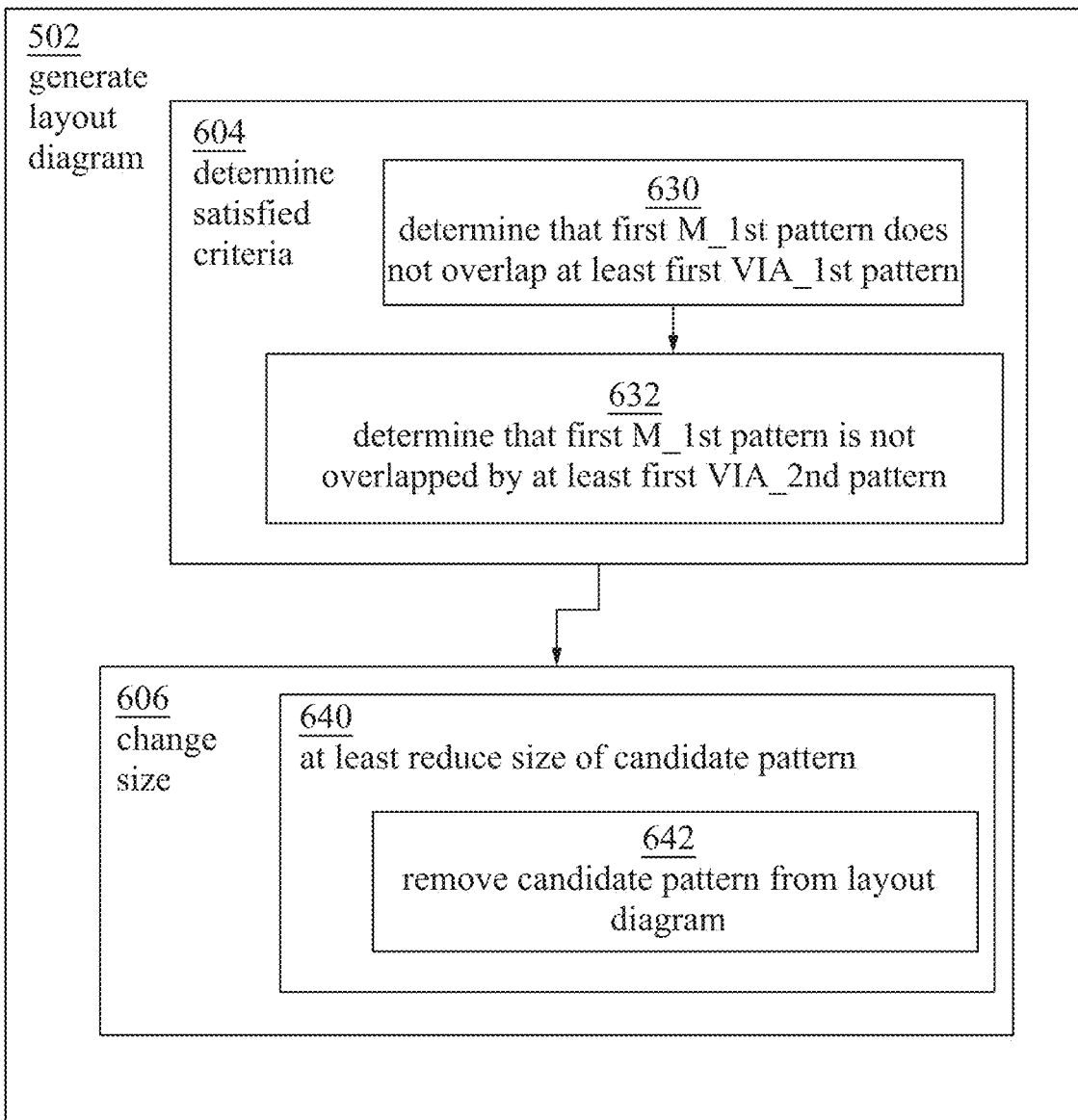

FIG. 6C is a flowchart of a method of generating a layout diagram, in accordance with some embodiments.

More particularly, the method of FIG. 6C shows blocks 604 and 606 of FIG. 6A correspondingly in more detail, in accordance with one or more embodiments. A context of FIG. 6C is Design Rule 2.

An example of a layout diagram which can be generated according to the method of FIG. 6C is layout diagram 200D, or the like. Examples of a semiconductor device which can be manufactured based on layout diagrams generated according to the method of FIG. 6C include semiconductor device 100 FIG. 1, a semiconductor device based on layout diagram 200D, or the like.

In FIG. 6C, block 604 includes blocks 630-632. In blocks 630-632, the candidate pattern is the first M_1st pattern. At block 630, it is determined that the first M_1st pattern does not overlap at least a first via pattern in the VIA_1st level (first VIA_1st pattern). Examples of an M_1st pattern which does not overlap at least a first VIA_1st pattern include M0 patterns 218(12) and 218(14) of FIG. 2C, or the like. From block 630, flow proceeds to block 632.

At block 632, it is determined that the first M_1st pattern is not overlapped by a least a first VIA_2nd pattern. Examples of an M_1st pattern which is not overlapped by at least a first VIA_1st pattern include M0 patterns 218(12) and 218(14) of FIG. 2C, or the like.

In FIG. 6C, block 606 includes block 640. At block 640, the size of the candidate pattern is at least reduced. Block 640 includes block 642. At block 642, the candidate pattern is removed from the layout diagram. An example of removing the candidate pattern is the removal of M0 pattern 218(12) from FIG. 2C as indicated by corresponding phantom shape 218(12)' in FIG. 2D.

Figure 6D:
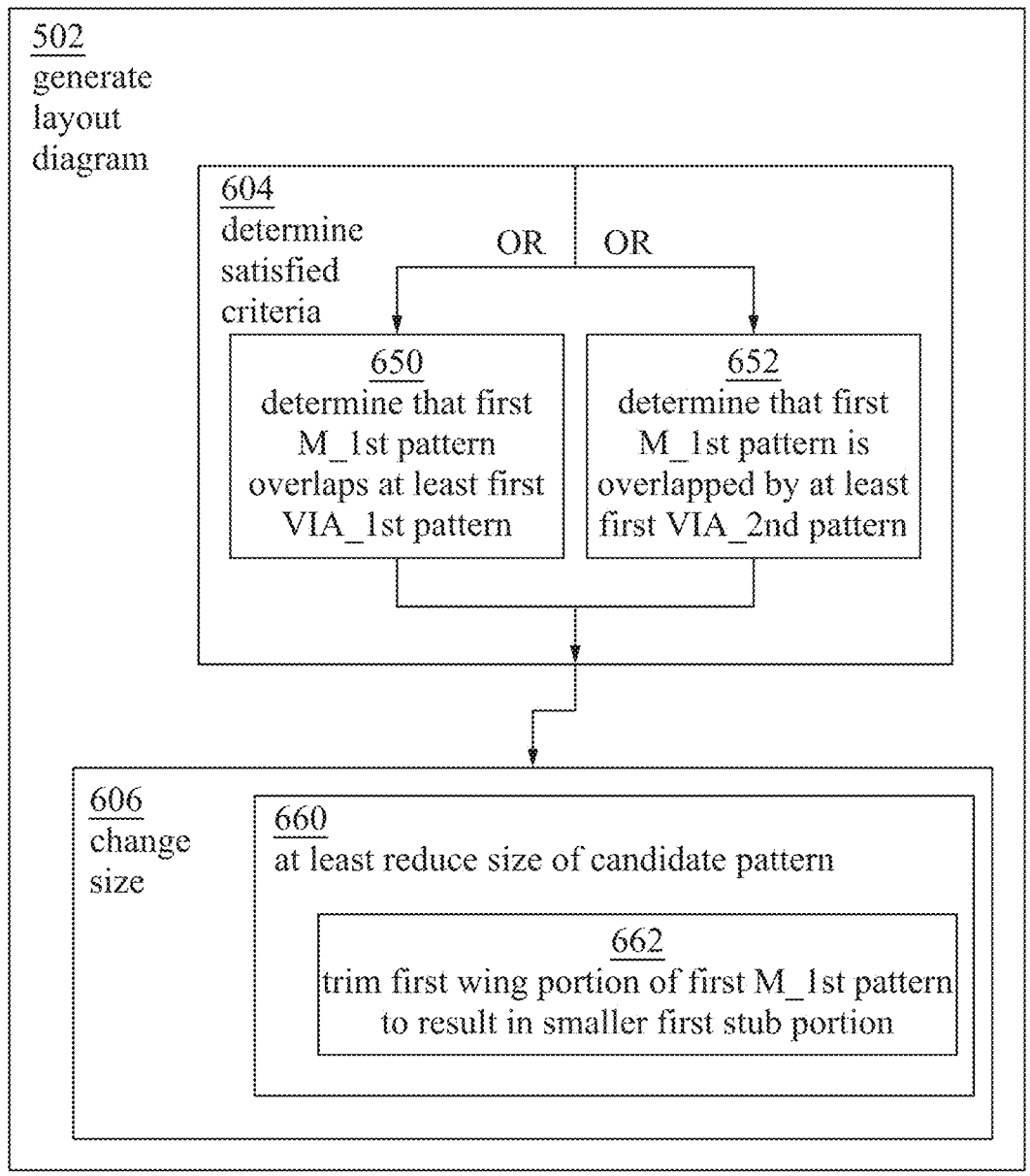

FIG. 6D is a flowchart of a method of generating a layout diagram, in accordance with some embodiments.

More particularly, the method of FIG. 6C6D shows blocks 604 and 606 of FIG. 6A correspondingly in more detail, in accordance with one or more embodiments. A context of FIG. 6C is Design Rule 3.

An example of a layout diagram which can be generated according to the method of FIG. 6D is layout diagram 200F, or the like. Examples of a semiconductor device which can be manufactured based on layout diagrams generated according to the method of FIG. 6D include semiconductor device 100 FIG. 1, a semiconductor device based on layout diagram 200F, or the like.

In FIG. 6D, block 604 includes blocks 650-652. In blocks 650-652, the candidate pattern is the first M_1st pattern. As shown in FIG. 6D, flow proceeds to block 650 or block 652. At block 650, it is determined that the first M_1st pattern overlaps at least a first via pattern in the VIA_1st level (first VIA_1st pattern). Examples of a M_1st pattern which overlaps at least a first VIA_1st pattern include M0 patterns 318(1)(A), 318(2)(C), 318(3)(E) and 318(4)(G) of corresponding FIGS. 3A, 3C, 3E and 3G, or the like.

At block 652, it is determined that the first M_1st pattern is overlapped by at least a first via pattern in the VIA_2nd level (first VIA_2nd pattern). Examples of a M_1st pattern which is overlap by at least a first VIA_2nd pattern include M0 patterns 318(1)(A) and 318(3)(E) and 318(4)(G) of corresponding FIGS. 3A and 3E, or the like.

In FIG. 6D, block 606 includes block 660. At block 660, the size of the candidate pattern is at least reduced. Block 660 includes block 662. At block 662, the size of a wing portion of the candidate pattern is trimmed to result in a smaller stub portion. An example of a wing portion and a corresponding wing portion is as follows. An example of the wing portion is the first wing portion of M0 pattern 318(1)(A), which corresponds to a combination of third portion 338(1) of M0 pattern 318(1)(A) and the second portion of M0 pattern 318(1)(A) that extends to the left of VGD pattern 316(1) by a width 336(1) in FIG. 3A. An example of the corresponding stub portion is the second portion of M0 pattern 318(1)(B) that extends to the left of VGD pattern 316(1) by a width 336(1) in FIG. 3B.

Figure 6E:
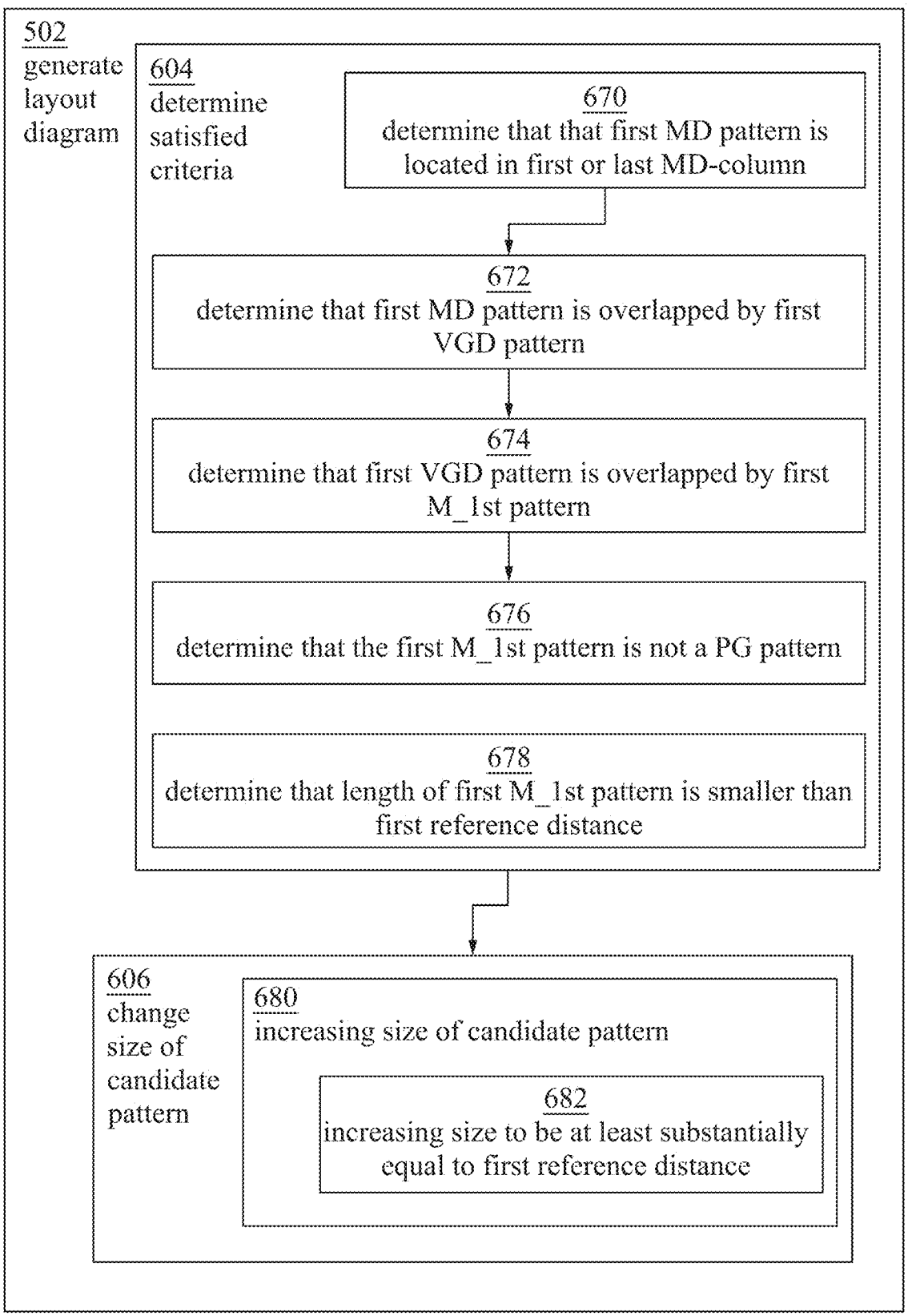

FIG. 6E is a flowchart of a method of generating a layout diagram, in accordance with some embodiments.

More particularly, the method of FIG. 6E shows blocks 604 and 606 of FIG. 6A correspondingly in more detail, in accordance with one or more embodiments. A context of FIG. 6E is Design Rule 4.

An example of a layout diagram which can be generated according to the method of FIG. 6E is layout diagram 200F, or the like. Examples of a semiconductor device which can be manufactured based on layout diagrams generated according to the method of FIG. 6E include semiconductor device 100 FIG. 1, a semiconductor device based on layout diagram 200F, or the like.

In FIG. 6E, block 604 includes blocks 670-676. In blocks 670-676, the candidate pattern is the first M_1st pattern. At block 670, it is determined that the first MD pattern is located in first or last MD-column. Examples of MD patterns located in a first MD-column include MD patterns 210(15) and 210(18) of FIG. 2E, or the like. Examples of MD patterns located in a last MD-column include MD patterns 210(17) and 210(20) of FIG. 2E, or the like. From block 670, flow proceeds to block 672.

At block 672, it is determined that the first MD pattern is overlapped by a first via pattern in the VIA_1st level (first VIA_1st pattern). Examples of a MD pattern which is overlapped by a first VIA_1st pattern include MD patterns 210(15), 210(17), 210(18) 210(20) of FIG. 2E, or the like. From block 672, flow proceeds to block 674.

At block 674, it is determined that the first VIA_1st pattern also is overlapped by the first M_1st pattern. Examples of the first VIA_1st pattern also being overlapped by the first M_1st pattern include VIA0 patterns 216(17), 216(18), 216(23) and 216(22) of FIG. 2E, or the like. From block 674, flow proceeds to block 676.

At block 676, it is determined that the first M_1st pattern is not also a PG pattern. An example of a first M_1st pattern that is not also a PG pattern is M0 pattern 218(20) of FIG. 2E, or the like. From block 676, flow proceeds to block 678.

At block 678, it is determined that the length of the M_1st pattern is smaller than a first reference distance. An example of the first reference distance is L2 (see FIGS. 2E-2F).

In FIG. 6E, block 606 includes block 680. At block 680, the size of the candidate pattern is increased. Block 680 includes block 682. At block 682, the candidate pattern is increased in size to be at least substantially equal to the first reference distance. An example of the candidate pattern being increased in size is M0 pattern 218(20)' of FIG. 2F having been increased in size by an amount ΔW, as shown in FIG. 2F by reference number 234.

Figure 7:
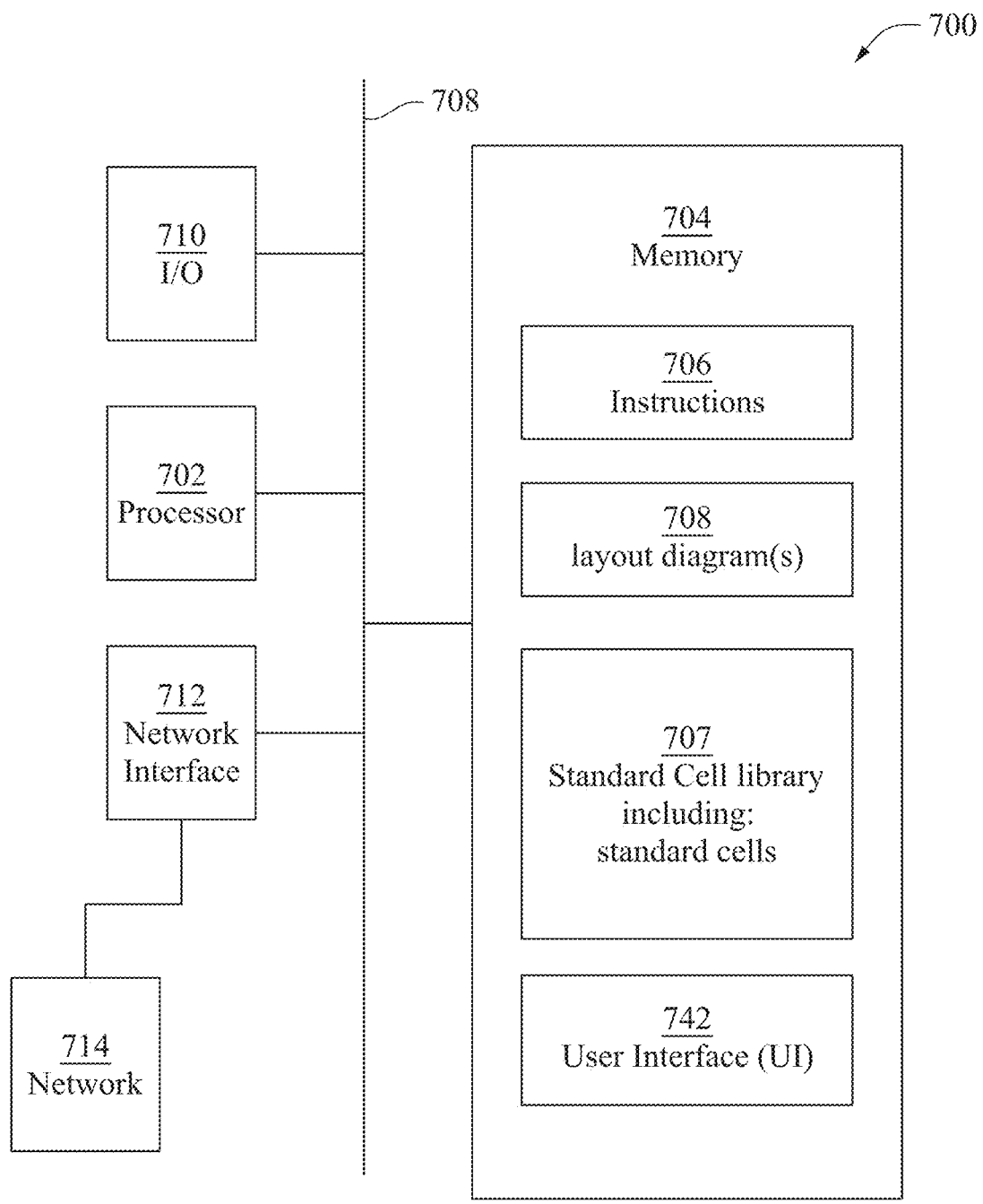
FIG. 7 is a block diagram of an electronic design automation (EDA) system, in accordance with some embodiments.

FIG. 7 is a block diagram of an electronic design automation (EDA) system 700, in accordance with some embodiments.

In some embodiments, EDA system 700 includes an automatic placement and routing (APR) system. Methods described herein of generating PG layout diagrams, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of a method according to an embodiment, e.g., the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code (instructions) 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein and one or more layout diagrams 708 such as are disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods are implemented as a software application running on EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
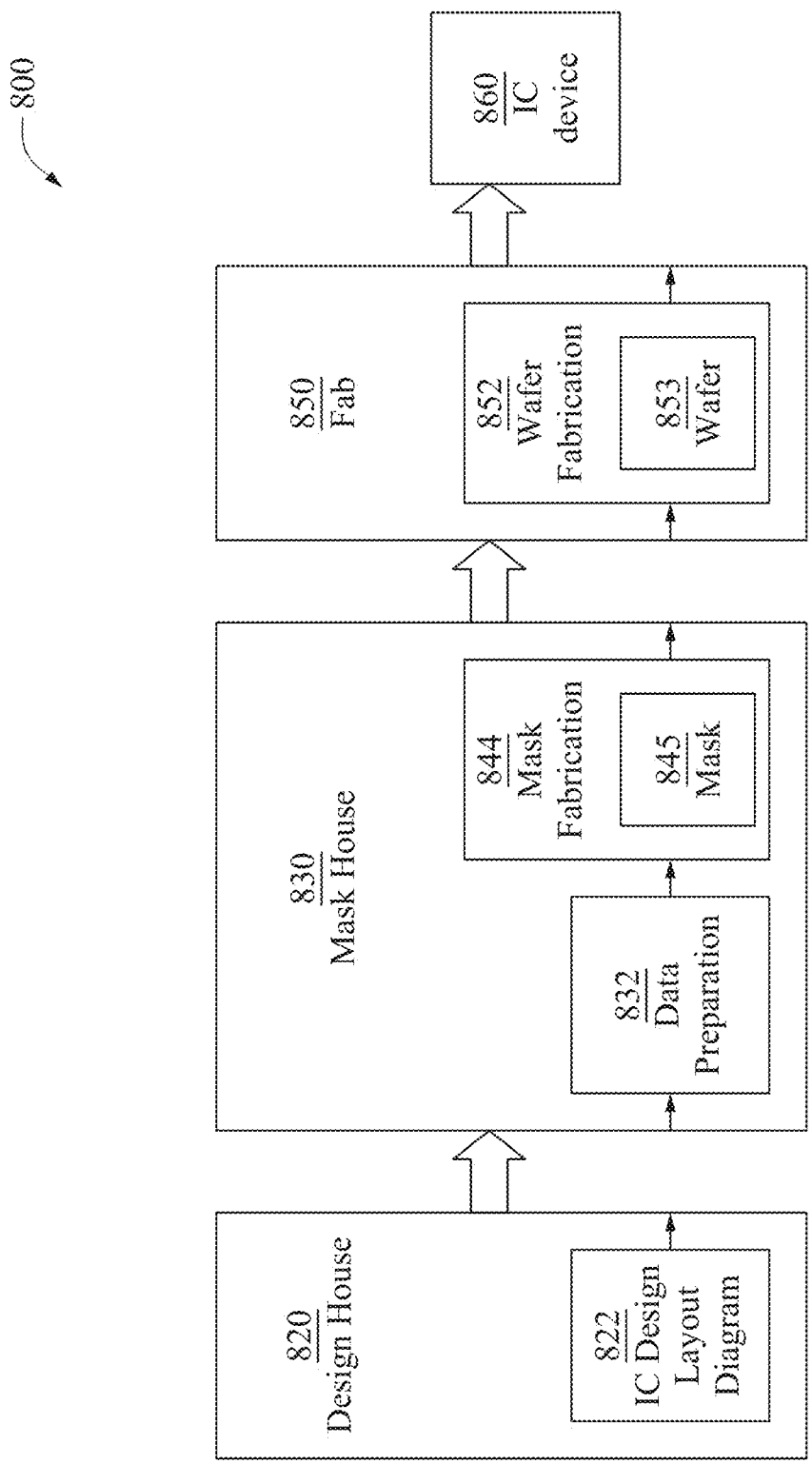
FIG. 8 is a block diagram of an integrated circuit (IC) manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, a method (of manufacturing a semiconductor device) includes, for a layout diagram stored on a non-transitory computer-readable medium, the semiconductor device being based on the layout diagram, the layout diagram including a first level of metallization (M_1st level) and a first level of interconnection (VIA_1st level) thereover corresponding to a first layer of metallization and a first layer of interconnection thereover in the semiconductor device, generating the layout diagram including: selecting a candidate pattern in the layout diagram, the candidate pattern being a first conductive pattern in the M_1st level (first M_1st pattern); determining that the candidate pattern satisfies one or more criteria; and increasing a size of the candidate pattern thereby revising the layout diagram.

In some embodiments, the layout diagram further includes a transistor level corresponding to a transistor layer in the semiconductor device; a cell of the layout diagram is organized into MD-columns, the MD-columns extending in a first direction; relative to a second direction substantially perpendicular to the first direction, and for first and last ones of the MD-columns which are located proximal to first and second boundaries of the cell, the determining that the candidate pattern satisfies one or more criteria includes determining that a first metal-to-drain/source (MD) pattern in the transistor level is located in the first MD-column or the last MD-column, determining that the first MD pattern is overlapped by a first gate-drain/source (VGD) via pattern, determining that the first VGD pattern is overlapped by the first M_1st pattern, and determining that a length of the first M_1st pattern is smaller than a first reference distance; and the increasing a size of the candidate pattern includes, relative to the second direction, increasing a length of the first M_1st pattern to be at least substantially equal to the first reference distance; and wherein the first MD pattern and the first VGD pattern represent corresponding MD and VGD structures in the transistor layer of the semiconductor device. In some embodiments, the determining that the candidate pattern satisfies one or more criteria further includes determining that the first M_1st pattern is not a power grid (PG) pattern. In some embodiments, the first reference distance is greater than a second reference distance; and relative to a typical fabrication tolerance of a semiconductor process technology node which produces the semiconductor device, the second reference distance represents a minimum length of a conductive segment in the M_1st level. In some embodiments, the first reference distance is represented by L2; and L2 is greater than one contacted poly pitch (CPP) for a semiconductor process technology node corresponding to the semiconductor device. In some embodiments, there are no levels of metallization between the M_1st level and the transistor layer; and L2≈1.5CPP. In some embodiments, the method further includes, based on the layout diagram, at least one of: (A) making one or more photolithographic exposure; (B) fabricating one or more semiconductor masks; or (C) fabricating at least one component in a layer of a semiconductor integrated circuit.

In some embodiments, a system (for manufacturing a semiconductor device) includes at least one processor and at least one memory including computer program code for one or more programs, the at least one memory, the computer program code and the at least one processor being configured to cause the system to execute (for a layout diagram stored on a non-transitory computer-readable medium, the semiconductor device being based on the layout diagram, the layout diagram including a transistor level, a first level of metallization (M_1st level) and over the transistor level, and a first level of interconnection (VIA_1st level) over the M_1st level corresponding to a transistor layer, a first layer of metallization and a first layer of interconnection in the semiconductor device, a cell of the layout diagram being organized into MD-columns, the MD-columns extending in a first direction) generating the layout diagram including: selecting a candidate pattern in the layout diagram, the candidate pattern being a first conductive pattern in the M_1st level (first M_1st pattern); relative to a second direction substantially perpendicular to the first direction, and for first and last ones of the MD-columns which are located proximal to first and second boundaries of the cell, determining that the candidate pattern satisfies one or more criteria including determining that a first metal-to-drain/source (MD) pattern in the transistor level is located in the first MD-column or the last MD-column, determining that the first MD pattern is overlapped by a first gate-drain/source (VGD) via pattern, determining that the first VGD pattern is overlapped by the first M_1st pattern, and determining that a length of the first M_1st pattern is smaller than a first reference distance; and, relative to the second direction, increasing a length of the first M_1st pattern to be at least substantially equal to the first reference distance; and wherein the first MD pattern and the first VGD pattern represent corresponding MD and VGD structures in the transistor layer of the semiconductor device.

In some embodiments, the determining that the candidate pattern satisfies one or more criteria further includes determining that the first M_1st pattern is not a power grid (PG) pattern. In some embodiments, the first reference distance is represented by L2; and L2 is greater than one contacted poly pitch (CPP) for a semiconductor process technology node corresponding to the semiconductor device. In some embodiments, there are no levels of metallization between the M_1st level and the transistor layer; and L2≈1.5CPP. In some embodiments, the system further includes at least one of: a masking facility configured to fabricate one or more semiconductor masks based on based on the layout diagram; or a fabricating facility configured to fabricate at least one component in a layer of a semiconductor integrated circuit based on the layout diagram.

In some embodiments, a semiconductor device includes: a transistor layer that includes an active layer including active regions, an MD layer over the active layer and including metal-to-drain/source (MD) structures and gate structures over corresponding ones of active regions, and a VGD layer over the MD layer and including gate-drain/source (VGD) structures over corresponding ones of MD structures and the gate structures; a first layer of metallization (M_1st layer) over the VGD layer and including M_1st segments over corresponding ones of the VGD structures; a first layer of interconnection (VIA_1st layer) over the M_1st layer and including VIA_1st structures over corresponding ones of the VGD structures; a first one of the M_1st segments (first M_1st segment) extending in a first direction and overlapping a first via structure, the first via structure being a first one of the VGD structures (first VGD structure); a first end of the first M_1st segment extending to a first side of the first VGD structure by a first distance, the first distance being equal to a reference distance representing a minimum overhang relative to the M_1st layer; and a second end of the first M_1st segment extending to a second side of the first VGD structure by a second distance as follows: for a first circumstance in which the first M_1st segment overlaps a second via structure such that there is no other via structure more proximal to the second end of the M_1st segment than the second via structure, the second via structure being a second one of the VGD structures (second VGD structure) or a first one of the VIA_1st structures (first VIA_1st structure), the second distance being equal to a sum of (A) a third distance between the first VGD structure and the second via structure, (B) a size of the first VGD structure relative to the first direction, and (C) a fourth distance, the fourth distance being equal to the reference distance; or for a second circumstance in which there is no other via structure more proximal to the second end of the M_1st segment than the first VGD structure, the second distance being equal to the reference distance.

In some embodiments, for the first circumstance, the second via structure is the first VIA_1st structure. In some embodiments, for the first circumstance, the first M_1st segment further overlaps a third via structure, the third via structure being between the first VGD structure and the first VIA_1st structure, the third via structure being a second one of the VGD structures or a second one of the VIA_1st structures. In some embodiments, for the first circumstance, the third via structure is the second VGD structure. In some embodiments, the first VGD structure overlaps a corresponding one of the gate structures; and the second VGD structure overlaps a corresponding one of the gate structures. In some embodiments, the reference distance, WOH, has a range of values, (≈0.2CPP)≤WOH≤(≈0.3CPP), and wherein CPP is contacted poly pitch for a semiconductor process technology node corresponding to the semiconductor device. In some embodiments, the first VGD structure overlaps a corresponding one of the gate structures. In some embodiments, the first VGD structure overlaps a corresponding one of the MD structures.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, the method comprising:
   for a layout diagram stored on a non-transitory computer-readable medium, the semiconductor device being based on the layout diagram, the layout diagram including a first level of metallization (M_1st level) and a first level of interconnection (VIA_1st level) thereover corresponding to a first layer of metallization and a first layer of interconnection thereover in the semiconductor device,
generating the layout diagram including:
selecting a candidate pattern in the layout diagram, the candidate pattern being a first conductive pattern in the M_1st level (first M_1st pattern);
determining that the candidate pattern satisfies one or more criteria; and
in response to the determining that the candidate pattern satisfies the one or more criteria, increasing a size of the candidate pattern thereby revising the layout diagram.

2. The method of claim 1, wherein:
the layout diagram further includes a transistor level corresponding to a transistor layer in the semiconductor device;
a cell of the layout diagram is organized into MD-columns, the MD-columns extending in a first direction;
relative to a second direction substantially perpendicular to the first direction, and for first and last ones of the MD-columns which are located proximal to first and second boundaries of the cell, the determining that the candidate pattern satisfies one or more criteria includes:
determining that a first metal-to-drain/source (MD) pattern in the transistor level is located in the first MD-column or the last MD-column;
determining that the first MD pattern is overlapped by a first gate-drain/source (VGD) via pattern;
determining that the first VGD pattern is overlapped by the first M_1st pattern; and
determining that a length of the first M_1st pattern is smaller than a first reference distance; and
the increasing a size of the candidate pattern includes:
relative to the second direction, increasing a length of the first M_1st pattern to be at least substantially equal to the first reference distance; and
wherein the first MD pattern and the first VGD pattern represent corresponding MD and VGD structures in the transistor layer of the semiconductor device.

3. The method of claim 2, wherein the determining that the candidate pattern satisfies one or more criteria further includes:
determining that the first M_1st pattern is not a power grid (PG) pattern.

4. The method of claim 2, wherein:
the first reference distance is greater than a second reference distance; and
relative to a typical fabrication tolerance of a semiconductor process technology node which produces the semiconductor device, the second reference distance represents a minimum length of a conductive segment in the M_1st level.

5. The method of claim 2, wherein:
the first reference distance is represented by L2; and
L2 is greater than one contacted poly pitch (CPP) for a semiconductor process technology node corresponding to the semiconductor device.

6. The method of claim 5, wherein:
there are no levels of metallization between the M_1st level and the transistor layer; and
L2≈1.5CPP.

7. The method of claim 1, wherein:
the increasing the size of the candidate pattern comprises changing the candidate pattern from a non-pin pattern to a pin pattern.

8. The method of claim 1, wherein:
the one or more criteria comprise at least one criterion regarding a pre-existing via pattern in the layout diagram.

9. A system for manufacturing a semiconductor device, the system comprising:
at least one processor; and
at least one memory including computer program code for one or more programs;
wherein the at least one memory, the computer program code and the at least one processor are configured to cause the system to execute:
for a layout diagram stored on a non-transitory computer-readable medium, the semiconductor device being based on the layout diagram, the layout diagram including a transistor level, a first level of metallization (M_1st level) and over the transistor level, and a first level of interconnection (VIA_1st level) over the M_1st level corresponding to a transistor layer, a first layer of metallization and a first layer of interconnection in the semiconductor device, a cell of the layout diagram being organized into MD-columns, the MD-columns extending in a first direction, generating the layout diagram including:
selecting a candidate pattern in the layout diagram, the candidate pattern being a first conductive pattern in the M_1st level (first M_1st pattern);
relative to a second direction substantially perpendicular to the first direction, and for first and last ones of the MD-columns which are located proximal to first and second boundaries of the cell, determining that the candidate pattern satisfies one or more criteria including:
determining that a first metal-to-drain/source (MD) pattern in the transistor level is located in the first MD-column or the last MD-column;
determining that the first MD pattern is overlapped by a first gate-drain/source (VGD) via pattern;
determining that the first VGD pattern is overlapped by the first M_1st pattern; and
determining that a length of the first M_1st pattern is smaller than a first reference distance; and
relative to the second direction, increasing a length of the first M_1st pattern to be at least substantially equal to the first reference distance; and
wherein the first MD pattern and the first VGD pattern represent corresponding MD and VGD structures in the transistor layer of the semiconductor device.

10. The system of claim 9, wherein the determining that the candidate pattern satisfies one or more criteria further includes:
determining that the first M_1st pattern is not a power grid (PG) pattern.

11. The system of claim 9, wherein:
the first reference distance is represented by L2; and
L2 is greater than one contacted poly pitch (CPP) for a semiconductor process technology node corresponding to the semiconductor device.

12. The system of claim 11, wherein:
there are no levels of metallization between the M_1st level and the transistor layer; and
L2≈1.5CPP.

13. A semiconductor device comprising:
a transistor layer that includes:
- an active layer including active regions;
- an MD layer over the active layer and including metal-to-drain/source (MD) structures and gate structures over corresponding ones of active regions; and
- a VGD layer over the MD layer and including gate-drain/source (VGD) structures over corresponding ones of MD structures and the gate structures;

a first layer of metallization (M_1st layer) over the VGD layer and including M_1st segments over corresponding ones of the VGD structures;
a first layer of interconnection (VIA_1st layer) over the M_1st layer and including VIA_1st structures over corresponding ones of the VGD structures;
a first one of the M_1st segments (first M_1st segment) extending in a first direction and overlapping a first via structure, the first via structure being a first one of the VGD structures (first VGD structure);
a first end of the first M_1st segment extending to a first side of the first VGD structure by a first distance, the first distance being equal to a reference distance representing a minimum overhang relative to the M_1st layer; and
a second end of the first M_1st segment extending to a second side of the first VGD structure by a second distance as follows:
for a first circumstance in which the first M_1st segment overlaps a second via structure such that there is no other via structure more proximal to the second end of the M_1st segment than the second via structure, the second via structure being a second one of the VGD structures (second VGD structure) or a first one of the VIA_1st structures (first VIA_1st structure), the second distance being equal to a sum of (A) a third distance between the first VGD structure and the second via structure, (B) a size of the first VGD structure relative to the first direction, and (C) a fourth distance, the fourth distance being equal to the reference distance; or
for a second circumstance in which there is no other via structure more proximal to the second end of the M_1st segment than the first VGD structure, the second distance being equal to the reference distance.

14. The semiconductor device of claim 13, wherein:
for the first circumstance, the second via structure is the first VIA_1st structure.

15. The semiconductor device of claim 14, wherein:
for the first circumstance, the first M_1st segment further overlaps a third via structure, the third via structure being between the first VGD structure and the first VIA_1st structure, the third via structure being a second one of the VGD structures or a second one of the VIA_1st structures.

16. The semiconductor device of claim 15, wherein:
for the first circumstance, the third via structure is the second VGD structure.

17. The semiconductor device of claim 16, wherein:
the first VGD structure overlaps a corresponding one of the gate structures; and
the second VGD structure overlaps a corresponding one of the gate structures.

18. The semiconductor device of claim 13, wherein:
the reference distance, WOH, has a range of values, $(\approx 0.2 CPP) \leq WOH \leq (\approx 0.3 CPP)$, and wherein CPP is contacted poly pitch for a semiconductor process technology node corresponding to the semiconductor device.

19. The semiconductor device of claim 13, wherein:
the first VGD structure overlaps a corresponding one of the gate structures.

20. The semiconductor device of claim 13, wherein:
the first VGD structure overlaps a corresponding one of the MD structures.

* * * * *